US009237767B2

(12) United States Patent
Fiset

(10) Patent No.: US 9,237,767 B2
(45) Date of Patent: Jan. 19, 2016

(54) PHOTONIC WINE PROCESSOR

(75) Inventor: Peter Depew Fiset, Loudonville, NY (US)

(73) Assignee: Peter Depew Fiset, Loudenville, NY (US)

( * ) Notice: Subject to any disclaimer, the term of this patent is extended or adjusted under 35 U.S.C. 154(b) by 586 days.

(21) Appl. No.: 12/928,628

(22) Filed: Dec. 15, 2010

(65) Prior Publication Data

US 2011/0143000 A1    Jun. 16, 2011

Related U.S. Application Data

(60) Provisional application No. 61/284,253, filed on Dec. 15, 2009.

(51) Int. Cl.
*A21D 6/00* (2006.01)
*A23L 3/28* (2006.01)
*A23L 1/025* (2006.01)
*C12H 1/16* (2006.01)

(52) U.S. Cl.
CPC ............... *A23L 3/28* (2013.01); *A23L 1/0252* (2013.01); *C12H 1/165* (2013.01)

(58) Field of Classification Search
CPC ........ A23L 1/0252; A23L 3/28; C12H 1/165; C12G 1/00
USPC ............... 426/240, 241, 246, 248; 99/451
See application file for complete search history.

(56) References Cited

U.S. PATENT DOCUMENTS

| 3,037,116 A | * | 5/1962 | Weber | 250/435 |
| 3,787,587 A | * | 1/1974 | Weber | 426/248 |
| 3,878,386 A | | 4/1975 | Douglas | |
| 4,034,213 A | | 7/1977 | Norris | |
| 4,162,129 A | | 7/1979 | Bartholemew | |
| 4,344,113 A | | 8/1982 | Ditto et al. | |
| 4,494,452 A | | 1/1985 | Barzso | |
| 4,785,724 A | | 11/1988 | Vassallo | |
| 4,858,084 A | | 8/1989 | Sheryll | |
| 4,922,355 A | | 5/1990 | Dietz | |
| 4,952,369 A | | 8/1990 | Belilos | |
| 5,070,435 A | | 12/1991 | Weller | |
| 5,119,279 A | | 6/1992 | Makowsky | |
| 5,211,699 A | | 5/1993 | Tipton | |
| 5,293,912 A | | 3/1994 | Wildash | |
| 5,441,179 A | * | 8/1995 | Marsh | 222/190 |
| 5,446,289 A | | 8/1995 | Shodeen et al. | |
| 5,595,104 A | | 1/1997 | Delaplaine | |
| 5,879,068 A | | 3/1999 | Menashrov | |

(Continued)

OTHER PUBLICATIONS

Photoreactivation NPL, Applied and Enviornmental Microbiology, L. Salcedo, Photoreactivation and Dark repair in UV-Treated microogranisms: Effect of Temperature., Jan. 5, 2007.*

(Continued)

*Primary Examiner* — Preston Smith
(74) *Attorney, Agent, or Firm* — Carolyn S. Elmore, Esq.; Darlene A. Vanstone, Esq.; Elmore Patent Law Group, P.C.

(57) ABSTRACT

An apparatus and method for modifying the organoleptic properties of a beverage, such as wine in a bottle, said apparatus having a least one light-source, said light-source applying peak wavelengths at intensities and time durations optimal for modifying said beverage's organoleptic properties.

5 Claims, 10 Drawing Sheets

(56) References Cited

U.S. PATENT DOCUMENTS

| | | | |
|---|---|---|---|
| 5,920,075 A | 7/1999 | Whitehead | |
| 6,010,727 A * | 1/2000 | Rosenthal | 426/240 |
| 6,287,614 B1 | 9/2001 | Peiffer | |
| 6,332,706 B1 | 12/2001 | Hall | |
| 6,508,163 B1 | 1/2003 | Weatherill | |
| 6,557,459 B1 | 5/2003 | Phelps | |
| 7,299,743 B2 | 11/2007 | Moore | |
| 7,311,411 B2 | 12/2007 | VanderSchuit | |
| 7,401,935 B2 | 7/2008 | VanderSchuit | |
| 7,543,717 B2 | 6/2009 | Hinkle | |
| 7,614,614 B2 | 11/2009 | Sabadicci | |
| 8,692,210 B2 | 4/2014 | Fiset | |
| 2004/0219056 A1 | 11/2004 | Tribelsky et al. | |
| 2004/0222224 A1 | 11/2004 | Plester | |
| 2009/0269240 A1 | 10/2009 | Tanaka | |
| 2011/0081274 A1 | 4/2011 | Packman et al. | |

OTHER PUBLICATIONS

UVwineNPL,http://www.wrap.org.uk/sites/files/wrap/UV%20 &%20wine%20quality%20May'08.pdf, May 2008.*

Non-Final Office Action for U.S. Appl. No. 13/507,305, dated Aug. 9, 2013.

Notice of Allowance for U.S. Appl. No. 13/507,305, dated Nov. 22, 2013.

Non-Final Office Action for U.S. Appl. No. 14/186,221 dated Dec. 17, 2014.

* cited by examiner

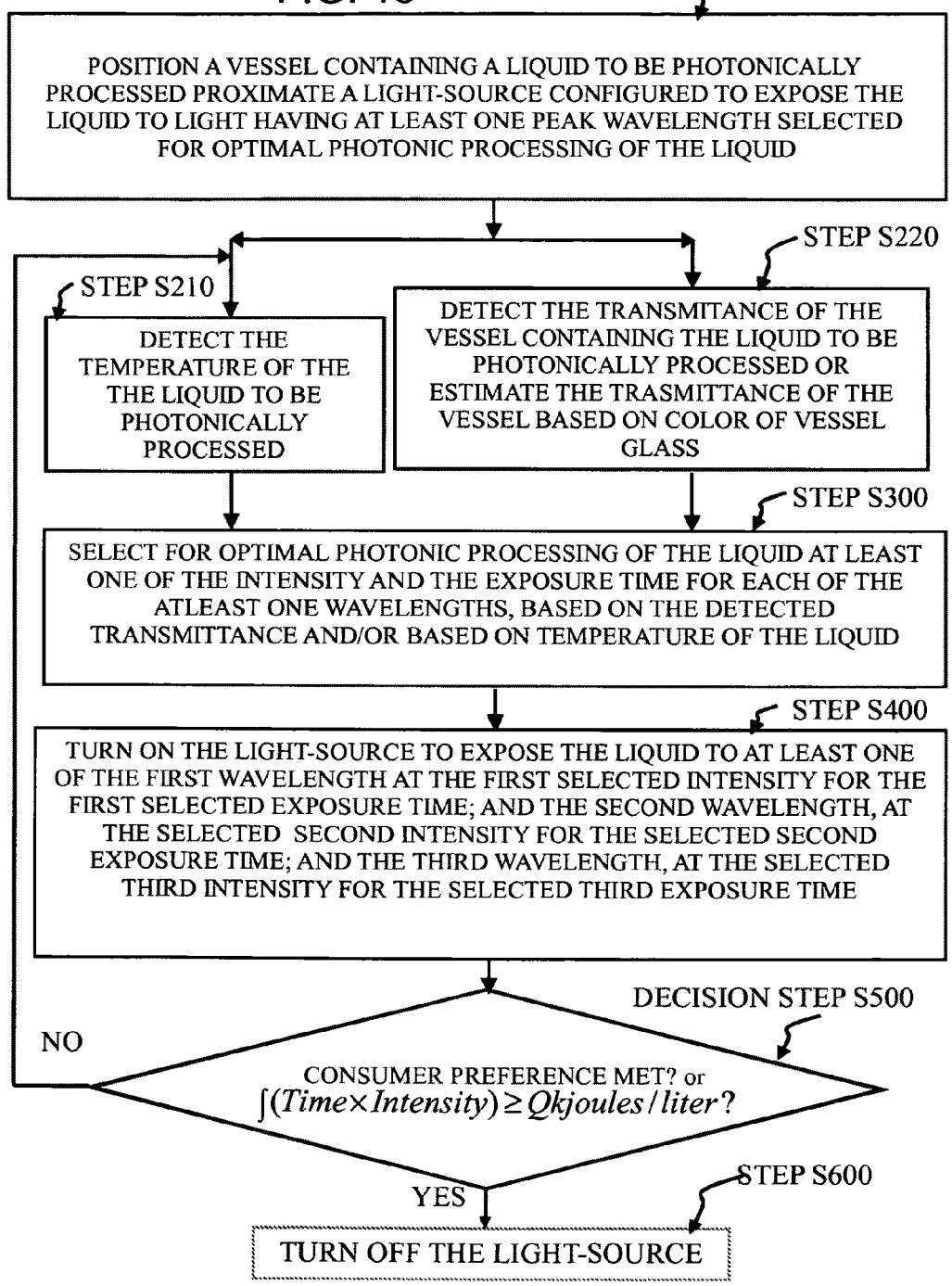

PHOTONIC WINE PROCESSOR

CROSS-REFERENCE TO RELATED APPLICATIONS

This application claims the benefit of priority, under 35 U.S.C. 111(b), of Provisional U.S. Patent Application No. 61/284,253 filed on Dec. 15, 2009 by the present inventor, which is hereby incorporated by reference herein in its entirety.

FEDERALLY SPONSORED RESEARCH

Not Applicable

SEQUENCE LISTING

Not Applicable

BACKGROUND OF THE INVENTION

1. Field of the Invention

The present invention relates to processing food and beverages, and more particularly to an apparatus and method capable of modifying at least one organoleptic property of a food or beverage by controlled exposure to light from an artificial light-source at energy densities on the order of 10 kilojoules/liter and at peak wavelengths longer than 350 nanometers.

2. Prior Art

Ultraviolet (UV) light is a form of electromagnetic energy that contains measurable wavelengths in the four nanometer to 400 nanometer range. Germicidal Ultraviolet (germicidal UVC) light is a subset of ultraviolet light (UV) and is a well-known sterilization agent. The use of germicidal UVC light for germicidal, bactericidal and pathogenicidal effects is well known. Suitable wavelengths for these effects is 300-200 nanometers. U.S. Pat. No. 4,952,369 issued to Belilos (Aug. 28, 1990), describes a portable, pocket-size, germicidal ultraviolet flashlight that can be used by ordinary individuals to kill germs and viruses on objects like toilet seats, flatware, and telephones. The "UVC flashlight" includes a housing, a germicidal UVC light source, a battery compartment, an on/off switch, and a gravity switch that limits the activation of the ultraviolet light source to the position wherein the light source is facing downward. By limiting the activation of the germicidal UVC source to while the device faces downward the device sought to reduce harm to eyes. The germicidal UVC lamp utilized by Belilos can be any type of light source generating germicidal UVC light in sufficient intensity to disinfect objects at relatively short distances. Col. 2, lines 6-9.

Similarly, U.S. Pat. No. 5,920,075 issued to Whitehead (Jul. 6, 1999), discloses a hand-held "Ultraviolet sterilization device" "wherein said ultraviolet light source operates in a wavelength spectra effective to have germicidal, bactericidal, and pathogenicidal effects."

Nothing in Belilos nor Whitehead teaches or suggests employing in their devices an ultraviolet lamp having peak wavelengths longer than 300 nanometers, at least because such ultraviolet light is not optimal for the purpose of effecting sterilization. Other UVC-sterilization apparatus are known to have interior chambers configured to contain an instrument, a vessel, gases, or other objects to be sterilized by exposure to germicidal UVC light and to prevent the escape of the germicidal UVC light into the room. For example, U.S. Pat. No. 5,466,289 issued to Shodeen et al. (Aug. 29, 1995), describes a pass-through sterilization chamber where items are placed in the sterilization chamber and subjected to germicidal UVC light. Typically, such sterilization devices employed mercury vapor lamps having a peak wavelength of 254 nm. Nothing this art teaches nor suggests employing in such devices an ultraviolet lamp having a peak wavelengths longer than 300 nanometers and having no peak wavelengths shorter than 300 nanometers, at least because ultraviolet light longer than 300 nanometers is not optimal for the purpose of effecting sterilization. Recently, "deep UV" LEDs have been developed that output peak wavelengths shorter than 350 nm, and even as low as about 234 nm to 264 nm, and these germicidal UV LEDs are being widely substituted by persons skilled in the art in place of the conventional germicidal UVC florescent tubes formerly employed in UV sterilization devices of the prior art. Semiconductor-Today, Vol 5. Issue 3, April/May 2010. See, also "Novel sterilization device using 265 nm UV-LED for *Escherichia coli*", by Miku Maeda et als, teaching the use of 9 series-connected 265 nm germicidal UV-LEDs (Part Nos. T9H26/T9L26 manufactured by Seoul Optodevice), to sterilize food and/or water containing *E. coli* bacterium, by the application of 0.5 Joules of 265 nm germicidal UVC light.

A combination of one or more food and/or beverages is herein referred to as "Foodstuff". A Foodstuff whose organoleptic properties are substantially modified in response to irradiation from a light-source is referred to herein as a light-sensitive Foodstuff (herein referred to as "LS-Foodstuff"). An LS-Foodstuff is comprising a combination of one or more Foodstuff types including, but not limited to, red wine, wine, fruit, fruit juice, fruit paste, vegetable, vegetable juice, vegetable paste, beer, coffee, natural flavorings, artificial flavorings, malt liquor, and liquor.

The typical conditions under which a Foodstuff is consumed involves subjective choices dependent on individual consumer preferences. Foodstuff processing is performed by operators of Foodstuff processing equipment to produce modified Foodstuffs that meet the preferred conditions for consumption which are combinations one one or more Foodstuff processing techniques including, physically manipulating, aggregating, separating, combining, heating, cooling, magnetic flux exposure, fermentation, pressurizing, vacuum exposure, aging, and cooking. There are a variety of previously known wine processing means and methods.

A wide variation of red wine types are consumed based on consumer preferences. A consumer develops preferences over time and each additional experience in general tends to increase the consumers knowledge and refinement of preferences. Some consumer's develop new preferences or refine previous preferences with each bottle of wine in the consumers aggregate experience. Some consumers prefer to consume certain red wines without any additional processing after opening a package. Some other consumers prefer to process red wines with a combination of one or more known processes including, aging, pressurizing, breathing, aerating, flavoring, magnetic flux exposure, heating, cooling, and mixing with additional ingredients. Some consumers dislike red wine and avoid consuming red wine because they are unaware of any process that would change the red wine to an appealing condition.

Examples of mixing red wines with other substances include, adding red wine to a sauce for a cooked food, and mixing red wine with fruit juices for a customized beverage. The process of heating red wine is common in colder climates. The process of cooling red wine is common at various stages of red wine manufacturing, bottling, and aging. Cooling red wine is less common immediately prior to consumption.

Typically, wine is prepared by a winery and then it is poured into a package for a period of storage until consumption at a later date. A wine bottler chooses a particular package for a plurality of purposes, including, reduce spoiling during the period of storage. The typical period of storage ranges from a few minutes to many years. The longer the period of storage the higher the probability that the wine will undergo a change of organoleptic properties. Wine aging is a well-known wine processing technique, which tends to have an optimal range. A wine aged too long tends to become spoiled eventually.

There are many package types that a wine is packaged in. Typical package types include, a glass bottle with a leek-proof cork, and a box with a leak-proof liner. Typical wine bottles are partially translucent with characteristic spectral transmittance. The wine bottle transmittance typically varies of over the surface of the bottle depending on variations of glass thickness, composition, and labeling characteristics. Typical wine bottles have labels, for identification, which tend to substantially block light transmission. Typical wine bottle labels cover only a fraction of the bottle, so that the consumer has a visual indication of the quantity of wine in the bottle. Very few wine bottles have a surface totally covered by a label. Typical wine bottle labels have various compositions and substantially block light transmission. A wine bottle glass color is characterized by the wine bottle glass spectral transmittance properties of white light. Common wine bottle colors are green, brown, and/or clear. Typical green wine bottle glass tends to transmit more green, violet, and UVA1 (herein defined as light with a wavelength between three-hundred-forty nanometers and four-hundred nanometers) and less red and blue. Typical brown wine bottle glass tends to transmit substantially no UVA1, no blue, almost no green, and about the same amount of red that green wine bottle glass passes. Box type wine packages allow substantially no light transmission. It is known that unintended, or otherwise uncontrolled, light exposure tends to have a detrimental effect upon Foodstuff. A vintner commonly chooses a colored bottle to limit the unintentional light exposure. However, the vintner's choice of a colored bottled does not predict the present inventions use of light of a specific spectral radiance to be used to process wine prior to consumption. The process by which wine is degraded by light exposure is known as "light-strike" and/or "light-struck wine". The light-struck wine condition tends to affect white wines and rosé wines more than red wines. Molecules, such as tannins, that reduce the effect of light-strike are found in higher concentrations in red wine than in white or rosé wines.

Wineries typically prepare the package with a small amount of air, known as the "ullage", in the package compared to the volume of wine. In some instances the wine packaging procedure purposefully leaves a small quantity of air in the package affects the change of wine organoleptic properties in a predictable manner. The air bottled with the wine in the package is not associated with the wine processing method known as "breathing", which occurs after the wine package is opened. Some wine is packaged without air including, boxed wines, which typically have a flexible bladder that collapses gradually as wine is gradually released without letting air into the bladder.

Breathing refers to a wine processing technique whereby wine is exposed to air in an open package, or decanted for a period of time prior to consumption. Wine breathing is less common for white wines and rosé wines. Wine aeration is similar to breathing and involves accelerating the exposure of wine to air by various techniques which typically involves increasing the surface area of the liquid wine to air interface.

Historically, the breathing of wine has been recommended by vintners for wine types including, but not limited to, red wines, Merlot, and Cabernet Sauvignon. There is no absolute wine breathing duration. Wine breathing is intended to have a duration that meets the consumer's preference. The technique of breathing a wine is an art learned typically by trial-and-error. Wine breathing often involves the consumer tasting a small sample of the wine undergoing the breathing process to determine when the wine is ready for consumption. A consumer typically samples the wine after an initial duration to determine if the wine requires further breathing; the determination is a subjective decision based on the consumer preferences. It is common for a bottle of red wine to be opened and allowed to breathe for a pre-determined period of time before the wine is consumed when a consumer has previous experience breathing a wine of the same or similar type, or when a trusted wine breathing recommendation is available. Some vintners suggest opening the wine and allow the wine to breathe a couple of hours prior to consumption for best flavor.

A problem exists when the wine consumer does not have enough time to allow a wine to breathe for the recommended or otherwise preferred time. For example, when a vintner recommends that the wine be allowed to breathe for three hours prior to consumption and the consumers only have fifteen minutes, then the wine will not be at the desired condition for optimal flavor. In many circumstances it is not possible to allow a wine to breathe for the recommended time prior to consumption. For example, at a restaurant the patrons may order a bottle of Merlot but do not want to wait the recommended time for the wine to breathe. This example represents a problem from the consumer's perspective in that the dinner will end before the wine, intended to be consumed with a meal, has had a chance to complete the preferred breathing time. Unfortunately, a wine may be consumed with sub-optimal organoleptic properties because of the lack of time needed for optimal wine breathing. In other unfortunate circumstances an air-sensitive wine is ruined by overexposure to air. Air-sensitive wines are typically old wines, and are typically not recommended to breathe.

U.S. Pat. No. 4,162,129 to Bartholemew, U.S. Pat. No. 4,494,452 to Barzs, U.S. Pat. No. 4,785,724 to Vassallo, U.S. Pat. No. 5,293,912 to Wildash, U.S. Pat. No. 5,595,104 to Delaplaine, U.S. Pat. No. 6,332,706 to Hall, U.S. Pat. No. 6,508,163 to Weatheril, and U.S. Pat. No. 7,299,743 to Moore describe aeration techniques used to modify the flavor of a wine; but do not describe the use of a light-source to modify the flavor of a wine. However, the aeration technique is limited to an opened bottle of wine, whereas photonic processing of wine can occur in either an open or an unopened bottle of wine. Therefore photonic wine processing overcomes the open bottle limitation of the aeration technique. While the aeration technique may reduce the processing time needed to achieve an equivalent modification of organoleptic properties when compared to breathing processing time, the potential problem remains with aeration or breathing, to not have enough time to achieve optimal modification of organoleptic properties of the wine prior to consumption. For example, aeration for an hour may achieve the same organoleptic properties change as three hours of breathing; but an hour may still be too long to wait before the wine is meant to be consumed. However, the present invention is capable of being used to provide the photonic processing on a closed bottle of wine well in advance in order to prepare for the possibility of a consumer's selection of the processed bottle for immediate consumption.

U.S. Pat. No. 6,287,614 to Peiffer describes a method and apparatus for improving the organoleptic properties of alcoholic beverages based upon exposure to a magnetic field. The usefulness of Peiffer's method and apparatus is toward the modification of an alcoholic beverages organoleptic properties that make the alcoholic beverage more appealing. However, Peiffer does not disclose an apparatus capable of modifying a Foodstuff with light. In addition, Peiffer does not disclose a method for modifying a Foodstuff with light.

U.S. Pat. No. 7,543,717 to Hinkle, and U.S. Pat. No. 7,614,614 Sabadicci describe the use of a Venturi type effect to modify the flavor of wine; but does not describe an apparatus capable of modifying a Foodstuff with light, and does not describe a method for modifying a Foodstuff with light.

U.S. Pat. No. 6,557,459 to Phelps describes a Nitrogen based preservation system with a light for illumination purposes so that a user is able to read the labels on the bottles, but does not describe an apparatus capable of modifying a Foodstuff with light, and does not describe a method for modifying a Foodstuff with light.

U.S. Pat. No. 3,878,386 to Douglas, U.S. Pat. No. 4,034,213 to Norris, U.S. Pat. No. 4,344,113 to Ditto, U.S. Pat. No. 4,858,084 to Sheryl, U.S. Pat. No. 4,922,355 to Dietz, U.S. Pat. No. 5,070,435 to Weller, U.S. Pat. No. 5,119,279 to Makowsky, U.S. Pat. No. 5,211,699 to Tipton, U.S. Pat. No. 5,879,068 to Menashrov, U.S. Pat. No. 7,311,411 to VanderSchuit, and U.S. Pat. No. 7,401,935 to VanderSchuit describe apparatus and methods useful for the illumination of Foodstuff; but does not describe an apparatus capable of modifying a Foodstuff with light, and does not describe a method for modifying a Foodstuff with light. VanderSchuit describes illuminating Foodstuff for the purpose of providing a visual effect. While the present invention illuminates wine, it is not a purpose of the present invention to provide a visual effect; for example in an alternate embodiment, the present invention achieves the desired results in an externally opaque chamber without any visual effects. VanderSchuit describes ultraviolet light highlighting a color corresponding to a flavor of the edible, such as a light highlighting an orange color associated with an orange flavored candy highlight, and a light highlighting a cherry-flavored candy piece which can be red. However, VanderSchuit does not describe a means nor a method by which the flavor of a LS-Foodstuff is modified by a controlled exposure to an effective wavelength range of light. In addition, VanderSchuit does not describe a controlled means nor a controlled method to modify the flavor of a Foodstuff to meet a consumers preference. VanderSchuit describes the use of ultraviolet light for highlighting an edible reactive to ultraviolet light to produce a visually stimulating effect. However, VanderSchuit does not describe the use of ultraviolet light to modify the flavor of an edible. In addition, VanderSchuit does not disclose an apparatus capable of modifying a Foodstuff with light. Furthermore, VanderSchuit does not disclose a method capable of modifying a Foodstuff with light.

There are instances when the set of previously known Foodstuff processing techniques are not capable of processing a red wine to meet a consumer's preferences. The prior art does not disclose the conditions under which the characteristics of wine are modified by the illuminated beverage container to meet the consumer preferences for a light-processed wine. On the contrary, the prior art describes an illuminating light neither intended nor capable of meeting a consumer's preferences for photonic wine processing. Whereas, the present invention discloses the intentional irradiation with a plurality of controlled light-sources of an LS-Foodstuff, including red wine, to irradiation conditions that are capable of processing an LS-Foodstuff to produce operator preferred results.

The present invention addresses some of the problems, inadequacies, and limitations of known wine processing techniques, including, limited breathing time and/or aeration time, by providing the novel wine processing techniques of a photonic beverage processor. The photonic beverage processor can be used independently or in combination with other known wine processing techniques to modify the characteristics of the wine. For example, depending on consumer preferences the photonic beverage processor can be used during the breathing process for decanted wine, and/or the photonic beverage processor can be used while the wine is in a bottle prior to the breathing process. The present invention provides vintners, distributors, and consumers, an additional benefit of changing a wines organoleptic properties, whether the wine is bottled or not bottled. In addition, the distinctly different processes of wine breathing and light-processing wine are not direct substitutes for each other, since the two processes do not modify the wine organoleptic properties in the exact same manner, and therefore do not necessarily produce results that meet the user preference to the same degree. The present invention helps to solve the problem of sub-optimal breathing time by creating conditions under which the wine's organoleptic properties are partially modified prior to the bottle being opened, thus reducing the time needed for the wine to breathe according to meet the consumers desired preference. The present invention does not make wine breathing redundant, but breathing is optional or partial breathing is optional when used with the present invention to meet the preferred results of an individual operator preferred results. Vintners use of colored bottles does not predict the present inventions use of controlled light-sources for a controlled sequence of exposure to a plurality of light-sources to meet the light-processing preferences of a light-processor operator intending to light-process wine to meet a consumers preferences. The present invention avoids the detrimental effects of light-strike by providing controlled conditions of exposure of wine to a controlled light-source responsive to operator control to meet the intended consumers preferences for photonic processing of Foodstuff including red wine. Creating the conditions for light-strike is not an intention of the present invention, except in the situation where the operator intensionally uses the present invention to do so. The present invention overcomes the limitations of the illuminated wine glass by providing suitable conditions that modify a wines organoleptic properties in a controlled manner set by an operator to substantially meet the preferences of the intended consumer (s).

While sunlight may change the organoleptic properties of LS-Foodstuffs, the use of sunlight in an uncontrolled or unintentional manner would create random results; where some of the random results were spoilage, and other random results were not significant, and where a small portion would represent an improvement that met a consumers preferences.

In conclusion, insofar as I am aware, no food and beverage processing apparatus previously developed provides the photonic processing of combinations of one or more LS-Foodstuffs including, but not limited to, red wine, liquor, coffee, and chocolate.

SUMMARY OF THE INVENTION

Various aspects of the present invention provide apparatus and methods of treating wine to improve the wine's organoleptic properties to meet a consumer's preferences, using exposure to light having wavelengths longer than 350 nanometers. This result may be accomplished by exposing the wine with light emitted from one or from a plurality of light-sources in a controlled manner according to operator input and/or sensor feedback with or without a combination of one or more other previously known food and liquid handling and processing techniques. The controller settings may include combinations of one or more controller variables including, but not limited to, the selection of available wavelength ranges, the intensity of the selected wavelength ranges, and the duration of available exposure to the selected wavelength ranges. The apparatus may have a plurality of operating modes, including, but not limited to, manual, automatic, and sensor-based process control loops. Since taste is a personal experience, the preferred exemplary embodiments incorporate a plurality of light-sources providing a plurality of wavelength ranges such that the operator can selectively expose the beverage to a light exposure process that suits the operator's preferences. The wine container may be selected to have one or more optimal wine container characteristics including, but not limited to, translucency at the wavelength range that allow for exposing the wine to the light.

An aspect of the present invention provides a photonic food and beverage processing apparatus capable of modifying at least one organoleptic property of a food or of a beverage by the controlled light exposure from a controlled light-source. Preferred exemplary embodiments of the present invention is a controlled photonic apparatus (herein referred to as a photonic beverage processor) directed to modifying the organoleptic properties of beverage(s) to meet an individual consumer's preferences.

Another aspect of the present invention provides a photonic food and beverage processing method for modifying at least one organoleptic property of a food or of a beverage by the controlled exposure to light from a controlled light-source. Exemplary methods include exposing a volume of red wine to a sequence or concurrent application of light emitted from one or more light-sources having effective wavelength ranges controlled to emit specific intensities and durations of exposure, e.g., depending on fluid-flow conditions and other factors.

Various embodiments of the present invention can be used independently or with other foodstuff processing techniques. A benefit of exemplary embodiments of the present invention is to provide an novel red wine processing technique based on controlled light exposure which can be used with or without other known red wine processing techniques. For example, a very old bottle of red wine which is not recommended to breathe because the very old wine is known to rapidly degrade upon exposure to atmosphere, can be processed using the whole-bottle method anaerobic ally. The present invention's light-based wine processing technique can process the old red wine while the wine is in the bottle before the old wine is opened and the old wine is exposed to air. Another example benefit of the present invention is an adjunct process to the breathing process of a red wine which is recommended for a breathing time for which the consumer cannot wait. An additional benefit of the present invention is the effect of controlled light exposure on changing the wine's organoleptic properties to bring the wine to a more desirable condition for consumption. Since a benefit is sensed by an individual wine consumer, a portion of wine consumers prefer the changes in wine organoleptic properties that the present invention provides compared to previously known wine processing techniques. The present invention has been shown to make significant modifications to the organoleptic properties of wine by experiment, disclosed herein, including blind taste test of multiple of people to select a preferred wine between wine of the same bottle that was processed in a first cup, and red wine that was not processed in a second cup of the same type as the first cup. In approximately ninety (90) percent of people performing the blind test preferred the red wine that was processed with the disclosed light-processor.

The intended-consumer's preferences may requires the operator to select the appropriate wavelength range from among the various wavelength ranges available within the present invention to modify the organoleptic properties of the wine. Given equal preferences among consumers over wavelength, then cost and ease of use become driving factors in the choice of wavelengths used. UVA1 is more difficult to provide due to the requirement for a closed form-factor to ensure that less UVA1 light was leaking into the operators environment than is allowed by applicable regulations, and the need for cover closed sensors to limit operation to conditions where the chamber is closed. Given equal preferences among consumers over wavelength, then Violet light is preferred over UVA1. Additional consideration are based on fixed cost and variable cost of operating the present invention based on power considerations and total cost of ownership which will vary depending on end-use. The manufacturer of the light-processor according to exemplary embodiments of the invention can offer a modular architecture so that the end-user can try different modes of operation and upgrade or change features without having to purchase an entirely new unit.

A benefit to the vintner is provided when a red wine is determined to need additional processing prior to bottling. Prior to bottling the preferred method is to use a clear glass or an open container to expose the wine to the light, or the continuous fluid-flow method. A useful benefit to the wine distributor occurs when the bottled wine does not meet the intended consumers expected preferences. The wine distributor uses an alternative embodiment of the present invention that allows for a greater volume of bottles to be processed. An advantage of a photonic beverage processor and methods of use over the previous wine processing techniques, includes, but is not limited to, the ability to process an un-opened bottle of wine, and in particular the modification of organoleptic properties of a red wine in an un-opened bottle having green glass or clear glass. An advantage of embodiments of the herein-disclosed photonic beverage processor and methods of use over previous wine processing techniques, includes, but is not limited to, the ability to process an un-opened bottle of wine prior to the wine being selected for consumption due to the persistent nature of the modified organoleptic properties of the wine resulting from photonic wine processing. An further a advantage of embodiments of the herein-disclosed photonic beverage processor and methods over previous wine processing techniques, includes, but is not limited to, the ability to process an un-opened bottle of wine which is recommended to avoid breathing or aeration wine processing techniques. Another advantage of embodiments of the herein-disclosed photonic beverage processor and methods over previous wine processing techniques, includes, but is not limited to, the ability to meet an individual consumer's preferences in a reasonable amount of waiting time. A further advantage of embodiments of the herein-disclosed photonic beverage processor and methods over previous wine processing techniques, includes, but is not limited to, the ability to effectively and repeatably control the processing parameters input settings of a photonic processor's controller.

Brown bottles typically have a lower spectral transmission over the entire spectrum when compared to typical green bottles. Typical clear bottles have higher spectral transmission than green bottles. Except in the rare instance where a brown bottle is very lightly colored, a typical brown wine bottle glass is ineffective at transmission of light capable of modifying the organoleptic properties of red wine. Therefore, a wine in a brown bottle is not recommended for use with the present invention since a brown bottle passes wavelengths longer than 500 nm more than wavelengths shorter than 500 nm. Fortunately, most red wine is bottled in green bottles. White wines which are more sensitive to light-strike are typically bottled in brown bottles than red wine. White wines can be processed by the present invention, but since white wine absorption of visible light is low, it is preferred that a white wine use a UVA1 wavelength range in an embodiment of the present invention that includes an internally reflective and externally opaque chamber.

The recommended method of processing wines in brown bottles is to remove the wine from the brown bottle and place the wine into a clear bottle prior to light-processing.

In a commercial setting the increase in time, and the choice to transfer the wine to a clear bottle prior to processing are also factors in a bulk processing method embodiment. Transferring the wine from a green bottle to a clear bottle reduces the power needed for an equivalent change by 5.75 times to 2.4 times that needed by a 365 nm peak UVA1 LED, but adds the additional step of having to transfer the wine. A method of transferring wine from a colored bottle to a clear bottle, or a green bottle, which limits the exposure to air is considered when the wine was going to be stored for either an undetermined or otherwise significant period of time prior to consumption. Depending on wavelength range, a green bottles typically require more photonic beverage processor output power and/or more time than clear bottles, and the operator make suitable adjustments to the controller to achieve the intended modification of organoleptic properties to meet consumer preferences. The increase in power is determined by the ratio of relative transmission of the two glass types at the wavelength. For example, a wavelength range of 365 nm peak has a spectral transmission of approximately 0.72 for a typical green bottle glass, and a spectral transmission of 0.88 for a typical clear bottle glass. The calculation to convert the energy in Joules without glass divided by the spectral transmittance of the glass at the wavelength provide an effectiveness factor useful for extrapolating and estimating process parameters. For example, a photonic processor treatment without glass of 100 Joules would be substantially equivalent to a process of 100 Joules divided by 0.72 equaling 138.9 Joules using a typical green glass bottle, and 100 Joules divided by 0.88 equaling 113.6 Joules using clear glass, and brown glass is not recommended at 365 nm peak wavelength. The processor can provide 100 Joules as a product of light exposure in Watts times the duration in seconds. Therefore, a photonic processor controller setting enabling 2 Watts of effective light with a peak at 365 nm would require 500 seconds to provide 1000 Joules of effective light, whereas a photonic processor controller setting enabling 0.2 Watts of effective light with a peak at 365 nm would require 5000 seconds to provide 1000 Joules of effective light. Since a limiting factor in a photonic processor is cost there is a design trade-off between increasing effective light power output and decreasing process duration, and between increasing effective light power output and increasing cooling system requirements.

Light-processing of red wines according to embodiments of the invention, can be very effective at meeting intended consumer's preferences. However processing white wines and/or rosé wines has not have a significant effect on the organoleptic properties, but instead has a mild effect. Therefore the light-processor is considered to be preferred to red wines unless the preferences of the intended consumers changes in the future.

Each type and/or variety of wine will have unique processing requirements, and therefore a method of determining the process parameters are given herein. The operator is recommended to obtain a peer reviewed photonic beverage processor settings selection and then to try the settings selection and make adjustments to suit the preferences of the intended consumers.

For example, the 750 milliliter bottle of Black Swan (Australia), Cabernet Sauvignon 2008, was processed in approximately two (2) hours with a total of approximately seventy-eight kilojoules of optical power with a peak wavelength of approximately four-hundred-five (405) nanometers in order to satisfy the preferences of the intended consumers. Another variety of wine is expected to require a different settings selection and is determined by trial-and-error using previous experience to more accurately predict the settings selection required to meet the preferences of the intended consumer. A general rule is to expect a more bitter or younger wine to take more total Joules of light energy to process than a more mellow or properly aged wine takes. This rule is not a hard and fast rule, and it is also recommended to experiment with small amounts of a sample wine in a cup to determine the extrapolation to a larger volume. If a settings selection is not available, then a method of processing a small quantity of wine quickly can be used to then extrapolate the results given a nearly linear relationship between the mass of wine treated and the total energy required to make a modification to the wine's organoleptic properties. In typical process the temperature and the pressure of the beverage is kept at the normal range for storing the beverage. Start the small quantity test by opening a bottle of wine, pour a small sample in a clean cup. A small sample (e.g., approximately 30 ml) is sufficient to provide a taste test. Prior to serving the wine, a small sample of the wine is tested to determine if the wine is ready to be served as-is, or should be processed with the photonic beverage processor prior to serving. The small sample can be tested by simply tasting the wine and/or measuring one or more wine organoleptic properties using calibrated measurement techniques.

Pour a cup of wine from the bottle, where the cup has a translucent material surface and/or other opening that allows the light to reach the wine. Place the cup in proximity to the present invention with the light directed at the cup's open top to expose to wine to the light. After determining the intended consumer's preferences, the type of wine, and the volume of liquid wine at atmospheric pressure, the controller or the operator calculates, or estimates, the sequence of wavelength ranges, intensities and duration settings prior to applying power to the present invention.

For example, a four ounce cup is used initially to treat wine with the light-processor. The wine can be tasted without drinking large amounts on the wine at convenient intervals; e.g., every 5 minutes to 15 minutes. Once the wine meets the intended consumer's preferences then an extrapolation of a linear method can be made to approximate the needed time to process a larger volume of wine. This extrapolation method is approximate and further taste-based settings selection refinement may be required on the larger volume of wine. The larger volume of wine can then be treated with the estimated time and power levels from the four ounce cup. After the light-processing sequence is finished, the bottle is optionally opened and tasted; when the wine is not suitably modified then continue with more light-processing. This procedure is dependent on the operator building an experience in a analogous manner as a chef would work with a stove and kitchen utensils to gain a process for cooking other Foodstuffs.

Various embodiments of the invention provide an apparatus for light-processing a liquid, comprising: a light chamber having a source of ultraviolet light having peak wavelengths longer than 350 nm and no peak wavelengths shorter than 500 nm, wherein the chamber is shaped for receiving and enclosing a vessel containing the liquid, wherein the liquid in the vessel is exposed to the ultraviolet light. In some exemplary embodiments, the vessel is a wine bottle, and in other exemplary embodiments, the vessel may be a wine glass.

The apparatus may include a sensor configured to detect the color of a wine bottle contained in the chamber, wherein the output of the source of ultraviolet light is varied depending upon the detection result. The apparatus may further include a form at the bottom of the chamber shaped to support, and to facilitate centering within the chamber, a round bottle having a first diameter and a round bottle having a second diameter not at the same time, so that the liquid content of such bottles are well-centered. In preferred embodiments, the ultraviolet light received at a surface of the liquid has an intensity of at least 10 millijoules/cm/cm.

The apparatus may further comprise a cooler for cooling the liquid and/or for cooling the source of ultraviolet light, wherein the cooler is one of a fan configured for forced-convection, a Peltier-junction thermoelectric cooler, a refrigeration unit, a passive convection air-channel, or a heat-sink.

In some exemplary embodiments, the ultraviolet light has peak wavelengths between 355 nm and 400 nm inclusive, and does not have peak wavelengths shorter than 355 nm.

The source of ultraviolet light may comprises a first UV-LED having a first peak wavelength, a second UV-LED having a second peak wavelength, and a third UV-LED having a third peak wavelength, wherein none of the full-value have half-max ranges of the first, second and third overlaps.

The apparatus may also includes a control circuit configured to enable the user to select at least one of the duration, intensity or total energy output by the source of ultraviolet light. This control circuit may be as simple as an electromechanical timer and/or a power switch, or a multi-variable interface, or an automatic controller.

Other exemplary embodiments of the invention provide an apparatus for light-processing a liquid, comprising: a first UV-LED having a first peak wavelength, a second UV-LED having a second peak wavelength, wherein the full-value have half-max range of the first UV-LED does not overlap the full-value have half-max range of the second UV-LED, wherein the peak wavelength of each of the first and second UV-LEDs is longer than 350 nm.

The apparatus may further comprise a third UV-LED having a third peak wavelength, wherein none of the full-value have half-max ranges of the first, second and third overlaps.

The apparatus may further comprise a fluid pumping mechanism in fluid communication with the liquid for transporting the liquid closer to the first and second UV-LEDs including a fluid inlet and a fluid outlet.

Other exemplary embodiment of the invention provide a method of processing a liquid food, said method comprising: exposing a liquid food to artificial light wherein the artificial light include at least one peak wavelength ranging between 355 nm and 800 nm inclusive and wherein the artificial light does not include a peak wavelength shorter than 355 nm nor longer than 800 nm, wherein said exposing is performed for a time sufficient to change an organoleptic property of the liquid food.

The method may further comprise cooling the liquid food while exposing the liquid food to the artificial light. The artificial light may includes a peak wavelength ranging between 355 nm and 400 nm inclusive and not include a peak wavelength longer than 400 nm. The organoleptic property of the liquid food can be changed within a period of less than 40 minutes.

The intensity and duration selected is preferably such that the liquid is exposed to a total of between 5 kilojoules/liter and 2000 kilojoules/liter of photonic energy from the artificial light over a period of time that preferably maintains a typical photonic beverage process temperature given available cooling capabilities. For example, a wine is relatively sensitive to light and may achieve an organoleptic change with approximately 5 kilojoules/liter. For example, a vodka, which is relatively insensitive to light, may achieve an organoleptic change at approximately 2000 kilojoules/liter. For example, a scotch and/or whiskey which is moderately sensitive to light may achieve an organoleptic change in approximately 500 kilojoules/liter. The temperature of the liquid, especially wine, is preferably maintained within the range of between about fifty-five degrees Fahrenheit and about sixty-five degrees Fahrenheit during the exposure. In some exemplary embodiments, the light may be ultraviolet light and the exposure takes place within a chamber.

Some exemplary embodiments may include light pipes, and a stopper providing a friction fit to engage the orifice of the bottle, wherein the fluid inlet and the fluid outlet pass through the stopper to bring the wine up from the bottle to pass closer to the light source disposed in a housing above the stopper.

Exemplary embodiments may also comprise an optical system for directing the light from said light source into the liquid, wherein the optical system includes a lens disposed proximate an LED to direct the light generated by the LED in the direction of the liquid. The optical system may also include a reflective layer disposed on the interior surface of the chamber.

Various exemplary embodiments of the present invention provide a photonic beverage processor comprising: a plurality of controlled light-sources emitting one or a plurality of peak wavelengths of light capable of modifying the organoleptic properties of wine. Such a photonic beverage processor may further include one or more light-source power supplies, a wine mass-measuring, a fluid-moving system a temperature-measuring sensor, and a variety of controllers responsive to operator input for specifying a sequence of exposures which may be defined by start time, stop time, wavelength range, and specifying the intensity of each wavelength range as a function of time, duration, fluid flow rate. Such a photonic beverage processor may further include a housing suitable for exposing an enclosed volume of Foodstuff light-sensitive Foodstuff ("LS-Foodstuff") (e.g., wine) to light for the useful purpose of processing LS-Foodstuff to meet an individual consumer preferences.

A simple shaking of the bottle is a sufficient method of fluid-moving for an un-opened bottle of wine. Simply stirring a cup of wine is a useful method of fluid-flow for an open container. Automated fluid flow results from a mechanical vibration from an unbalanced motor on a cup. Fluid-flow is important because light is absorbed and therefore the wine near the surface gets more exposure that the wine in the center of the container. Fluid-flow in the container allows a more consistent result. However, the absence of fluid flow produces a more complex result, and is similar to mixing a wine process with a photonic processor and fluid flow with a portion of the same wine without any photonic wine processing. Therefore, fluid-flow is also an optional step in the photonic wine processing process and ultimately depends on consumers preferences.

Various exemplary embodiments will now be described more fully with reference to the accompanying drawings in which some exemplary embodiments of the invention are shown. Detailed illustrative embodiments are disclosed herein. However, specific structural and functional details disclosed herein are merely representative for purposes of describing exemplary embodiments of the invention. This invention, however, may be embodied in many alternate forms and should not be construed as limited to only exemplary embodiments of the invention set forth herein.

Accordingly, while exemplary embodiments of the invention are capable of various modifications and alternative forms, embodiments thereof are shown by way of example in the drawings and will herein be described in detail. It should be understood, however, that there is no intent to limit exemplary embodiments of the invention to the particular forms disclosed, but on the contrary, exemplary embodiments of the invention are to cover all modifications, equivalents, and alternatives falling within the scope of the invention. For example, the photonic beverage processor can have other interior or exterior shapes and sizes; the light-sources can have other compositions and elements, such as filters, incandescent lamps, fluorescent, organic light emitting devices; the power-supply can be of various topologies suited for the type of light source, or the application. The light-sources can have many combinations and variations beyond those examples disclosed herein and/or can be established by customized specifications that meet an individual consumer's individual taste and preferences.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of exemplary embodiments of the invention. As used herein, the singular forms "a," "an" and "the" are intended to include the plural forms as well, unless the context clearly indicates otherwise.

In order to more completely describe exemplary embodiments of the invention, various aspects will be described in detail with reference to the attached drawings. However, the invention is not limited to exemplary embodiments of the invention described. Like numbers refer to like elements throughout the description of the figures, as follows (with description of the element following the element numeral): 2 top cover; 3 reflective chamber inner surface; 4 side wall; 5 air-permeable substantially opaque cooling fan cover; 6 LED-cooling fan; 7 first LED-array LED; 8 first LED-array inter-led series connection multi-conductor wiring; 9 LED portal; 10 average size beverage bottle of 750 milliliters; 11 reflective/opaque beverage label cover; 12 reflective multi-size bottle-centering platform; 12.1 bottle-centering area for smaller bottle; 12.2. bottle-centering area for larger bottle; 13 bottle-cooling air outlet conduit; 14 multi-conductor wiring controlling LED-cooling fan power; 15 multi-conductor wiring connecting first LED-array to controller; 16 mains power-supply wire; 17 mains power-plug; 18 controller with external operator interface; 19 riser pads; 20 air-permeable LED-cooling outlet cover; 21 LED-cooling air outlet conduit; 22 third multi-conductor wiring that connects LEDs in LED-array in series; 23 third LED-array LED; 24 multi-conductor wiring controlling bottle-cooling fan; 25 bottle-cooling fan; 26 air-permeable substantially opaque cooling fan cover; 27 reflective bottom surface of top cover; 28 air-permeable bottle-cooling outlet cover; 29 reflective air-permeable fan support; 30 multi-conductor wiring connecting top-cover sensor switch to the controller 18; 32 beverage cup; 33 adjustable height set-screw; 36 movement-limiting frictional rings; 38 battery operated controller 18 with external operator interface; 39 opaque wall; 42 multi-length light pipe; 44 fluid pump; 45 fluid inlet tube; 46 fluid outlet tube; 47 reflective bottom plate; 52 wiring of second series-connected LED-array; 54 Translucent tubing for photonic processing of flowing fluid; 60 forty-four separate LEDs arranged for soldering; 61 the forty-four LEDs 60 mechanically and electrically connected in series; 62 the series-connected array of forty-four LEDs 61 covered by an electrically insulating cover 66; 63 the forty-four series-connected LEDS 61 with insulating cover 66 and power terminal wires 68 and 69; 65 solder joint; 66 insulation cover; 67 cathode hookup wire; 68 anode hookup wire; 69 cathode bus bar; 70 anode bus bar; 71 light-opaque gasket; 72 anode bus power wire; 73 cathode bus power wire; 74 power-source to potentiometer wire; 75 power-return wire; 76 potentiometer with heat sink; 77 potentiometer slide (selector); 78 power-supply connector; 79 fan case; 81 bottle-positioning strap; 84 top "cover-closed" sensing switch (sensor); 85 Power switch; 86 Full-wave bridge rectifier; 87 Potentiometers (ganged); 88 Potentiometer single; 91 LED of first type; 92 LED of second type; 93 LED of third type.

BRIEF DESCRIPTION OF THE DRAWINGS

Exemplary embodiments of the invention are described in further detail below with reference to the accompanying drawings, in which:

FIG. 15 is a flow diagram of a method of photonic processing a liquid beverage according to an exemplary embodiment of the invention.

DETAILED DESCRIPTION OF EXEMPLARY EMBODIMENTS

Figure 1:
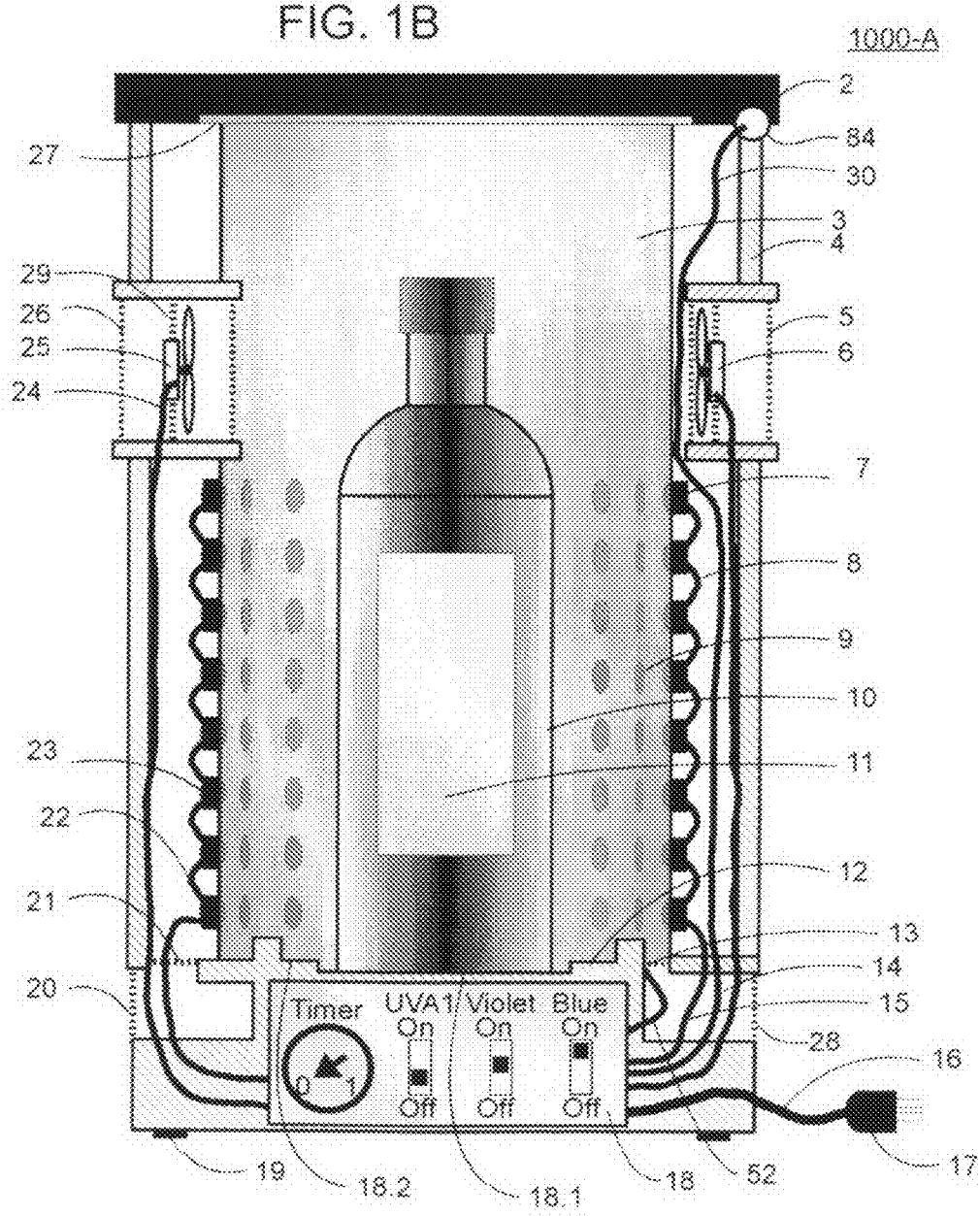
FIG. 1A is a perspective view of a photonic wine-processor 1000 having a covered form-factor configured to receive and process the contents of a wine bottle, according to an exemplary embodiment of the invention.
FIG. 1B is a side partial cut-away view of the photonic wine-processor 1000 (1000-A) of FIG. 1 having a form-factor suitable for receiving, centering and processing either a typical bottle of wine bottle or a large bottle of wine (shown with a typical sized wine bottle)

FIG. 15 is a flow diagram of a method of photonic processing a liquid beverage according to an exemplary embodiment of the invention.

In step S100, position a vessel (see wine bottle 11 positioned centrally in the apparatus 1000-A of FIG. 1B) containing a liquid to be photonically processed proximate a light-source configured to expose the liquid to light having at least one peak wavelength selected for optimal photonic processing of the liquid. And in step 220, detect the transmittance of the vessel containing the liquid to be photonically processed or estimate the transmittance of the vessel based on color of vessel glass. And, in (repeated) step S210, detect or measure the temperature of the liquid to be photonically processed. In step S300, select for optimal photonic processing of the liquid at least one of the intensity and the exposure time for each of the at least one wavelengths, based on the detected transmittance and/or based on the temperature of the liquid. In step S400, turn ON the light-source to expose the liquid to at least one of the first wavelength (at the first selected intensity for the first selected exposure time); and the second wavelength (at the selected second intensity for the selected second exposure time); and the third wavelength (at the selected third intensity for the selected third exposure time). Then, if the total exposure of the liquid exceeds a predetermined/selected threshold value Q kilojoules/liter ("YES" branch of decision step S500), then turn OFF the light source (S600) or otherwise prevent the liquid from further exposure to the light source. If the total exposure of the liquid does not yet equal or exceed the predetermined/selected threshold value Q kilojoules/liter ("NO" branch of decision step S500), keep the light ON (step S400) and modulate the light at each wavelength (step 300) according to the past exposure, and according to the detected temperature (step S210).

Given adequate fluid flow, (for consistent processing and heat removal) and temperature control in the container being exposed, there may exist a nearly linear relationship between wine volume and the mathematical product or integral of the exposure-duration times the light intensity over a wide operating range. A non-linear relationship exists between inadequate fluid flow and the total energy required to create a modification to a wine's organoleptic properties. Fluid flow is a factor also, where no fluid flow may not work well, and there is a minimum amount of fluid flow to effect an efficient change; e.g., typically a wine bottle should be shaken every 15 minutes. A non-linear relationship exists between wavelength and the total energy required to create a modification to a wine's organoleptic properties. A shorter wavelength typically is more capable of modifying a wine's organoleptic properties. However, since meeting consumer preferences are the ultimate goal of the photonic beverage processor each wavelength range which uniquely modifies a wine's organoleptic properties is included so that the consumer preferences are met.

An alternate embodiment of the present invention incorporates a relative spectral transmittance sensor in communication with the controller to automatically adjust the controller parameters to achieve the intended modification of organoleptic properties to meet consumer preferences. Wherein, the controller parameters include combinations of one or more parameters including, but not limited to, wavelength range, intensity, duration, and cooling capacity.

An alternate embodiment of the photonic beverage processor has controller settings for light, medium and dark green glass, olive glass, and clear glass. Brown glass is not recommended for use with the photonic beverage processor, since brown glass typically requires more than ten times the processing time over green bottles. White wine is not recommended for processing in the photonic beverage processor. It is recommended to transfer the contents of a brown wine bottle to preferably a clear bottle, or a green bottle when a clear bottle is not available, prior to light processing and optionally back to the brown bottle for storage.

Clear bottle transmission is fairly flat at ninety (90) percent from approximately 365 nm to 800 nm; allowing any wavelength range to be used depending on consumer preferences. An alternate embodiment of the present invention incorporates a photo-detector and calibrated LED (light emitter) to measure the transmission of the glass of a bottle. The photo-detector is selected from known photo-sensor types including, but not limited to, photoresistor, photodiodes, phototransistors, and reverse biased LEDs. The apparatus measures the spectral transmission of the glass of the bottle and adjusts the power and/or time to predict the total Joules needed to process the wine per the operators selections to meet the consumers preferences. Estimate or measure the bottle spectral transmission for setting the light-processor controls prior to starting the light-processing. Start the light processing manual mode, wait for the calculated or estimated duration of exposure, and manually stop the processing by removing power. Alternatively, set the timer of the apparatus for the preferred power-on time, or other sequence of times when using a multi-wavelength range version of the light-processor. A multi-wavelength processor will have controls for independently controlling intensity and duration of exposure to each wavelength. When multiple wavelengths are combined into a single controlled light-source, then the light-source is considered to have multiple peak intensities. Otherwise if all the wavelength sources are controlled together then the apparatus effectively employs a single light-source with multiple peaks.

To create the most versatile beverage processor with the least requirements for enclosure restrictions, then using an LED having a peak wavelength of 405 nanometers provides a preferred full width at half maximum (FWHM) wavelength range. To create the most effective photonic beverage processor with the least amount of wine heating due to photon absorption, then using and LED having a 365 nanometer peak wavelength provides a preferred full width at half maximum (FWHM) wavelength range.

If in-bottle processing is desired and Blue light of four-hundred-seventy (470) nanometers is preferred by the consumer then the light-processor operator should address the need for more power and provide increased cooling to provide the desired service.

The most effective photonic wine processing wavelengths range from 355 nanometers to 490 nanometers. For open photonic processors wavelengths of approximately 405 nanometers or longer are preferred due to restrictions on ultraviolet light exposure. Red wines are the preferred beverage to be processed. However, the photonic beverage processor may optionally include any suitable wavelength useful in meeting the preference of the consumer.

Overexposure of wine to a photonic wine processor according to any embodiment of the invention should be avoided since there is experimental evidence that prolonged wine processing is not preferred by all consumers. Therefore, photonic wine processing should be performed to taste, and in an analogous manner as cooking food is performed to taste. There is a range of processing parameters that meet a consumers preferences.

Green, red, and incandescent lamps were not as effective at converting the organoleptic properties of wine and are not the preferred wavelength ranges for the present invention. One of the problems with green, red, and incandescent lamps is that the amount of energy required to make a change requires substantial cooling techniques and the device becomes impractical for a counter top. Unless a consumer had a specific preference for a wavelength longer than 500 nm then the present invention will recommend using between 355 nm and 490 nm peak wavelengths. Also, for home use the risk of UV exposure is minimized by using wavelengths longer than 400 nanometers.

Red wine passes red light very efficiently, so that the reflecting surfaces in the light-processor become a critical element in making sure that as much red light is reflected as many times as is needed to be absorbed by the wine. When using red light it is recommended that the wine be transferred to a clear bottle to decrease the absorption by the glass bottle.

A green glass bottle passes approximately thirty (30) percent of light with wavelength at four-hundred-seventy (470) nanometers, and sixty (60) percent at 405 nm. Therefore, four-hundred-five (405) nanometers is preferred over four-hundred-seventy (470) nanometers when the consumer preference are equal for these two wavelengths. Cooling requirements are reduced when more light reaches the wine, and when the light is more effective.

Green glass transmission peaks at seventy-two (72) percent at approximately three-hundred-sixty-five (365) nanometers and therefore is the preferred wavelength of processing wine in the bottles when consumers preference are equal across the spectrum. There are multiple peaks in the green glass spectral transmission chart such that UVA1 to violet is the preferred range of light to process red-wine given no over-riding preference due to consumers.

Blue light between 420 and 480 nm has poor transmission through a green glass bottle, and therefore the operator is recommended to transfer the red wine to a clear bottle when blue light is to be used because user preference are weighted toward the results blue light produces. Blue light can be used with an un-opened green bottle but requires the time increase by a factor of the spectral transmission at 365 nm divided by the spectral transmission at 470 nm; e.g., 1 hour processing for UVA1 becomes 1 hour times 0.7 divided by 0.3 or 2.3 hours for blue light at the same power level. Since UVA1 is more effective at converting wine per unit energy reaching the wine, there is even more energy expense for using blue light as a substitute for UVA1. The ratio of the effectiveness of blue light to the effectiveness of UVA1 is an additional factor for extrapolating estimated processing parameters from UVA1 to blue light.

The variables to determine specifications of the process includes Volume of wine, Area of exposure, spectral transmission through container, temperature, pressure, and duration of exposure. In a dynamic process the order and integration of differential quantities is made over time. The sequence is critical to meeting a consumer preference.

The sequence of sub-processes include duration, intensity, pressure, vibration, fluid-flow, mixing, wavelength range. An example of a complex consumer preference would be a "romantic simulation" that requires a full spectrum of wavelength ranges that would be to approximate the organoleptic properties that would be achieved if the bottle were exposed to a thousand sunsets in a particular place (e.g., on a beach at Shirahama Beach Resort in Nanki, West Japan).

FIG. 1A is a perspective view of a photonic wine-processor 1000 having a covered form-factor configured to receive and process the contents of a wine bottle, according to an exemplary embodiment of the invention.

The covered photonic beverage processor 1000 has a whole-bottle form factor adapted to enclose and process the contents of a whole wine bottle. In FIG. 1A, the power supply is the standard mains power supplied to a building or hospital. In the United States, that power source is either a 110v alternating current or 220v alternating current power supply. The photonic processing apparatus 1000 of FIG. 1A is coupled to the power supply through a power cord. It is to be understood that the power cord is a conventional power cord sufficient to supply the necessary current to the apparatus 1000. It is also to be understood that coupling the apparatus 1000 to the mains of a building is only one alternative of supplying power to the apparatus 1000. Another alternative includes a battery power supply within or coupled to the apparatus.

The power supplied to the apparatus 1000 of FIG. 1A must be sufficient to enable the apparatus 1000 to produce a light having an intensity sufficient to affect the organoleptic properties of food within a desired period of time. This exemplary embodiment of the invention contemplates that the preferred intensity of the light generated is approximately 5 milliwatts/cm/cm to 500 milliwatts/cm/cm.

FIG. 1B is a side partial cut-away view of the photonic wine-processor 1000 (1000-A) of FIG. 1 having a form-factor suitable for receiving, centering and processing either a typical bottle of wine bottle or a large bottle of wine (shown with a typical sized wine bottle).

A photonic beverage processor adapted for use with a wine bottle (opened or unopened) is shown in FIG. 1A and FIG. 1B. The through-glass whole-bottle method requires an estimate of light transmittance through the glass if the bottle is to remain un-opened during processing. Therefore, the whole-bottle method benefits from experience or simple experimentation with the photonic process for the particular wine, and thus a bar-code reader for scanning the bar-code on the label of the wine bottle tied to a database of settings can facilitate the selection of exposure settings for each different wine product. Generally the experience required to select settings may be derived from simply tasting a single cup of the same type of wine several times as processing progresses, and the controller settings may be extrapolated for a larger volume of wine (e.g., for 750 ml in the bottle), and factored for the bottles geometric loss factor and glass transmission losses. After gaining experience with a bottle of wine of a certain type, the user can make further customized refinements in the process control to process a bottle of wine of the type to be processed.

A history of successful operating parameters for the photonic beverage processor may be compiled into a database, and made available in various media formats (e.g., flash memory, an on-line database), for specific wine types to provide feed-forward control of the photonic beverage processor. The photonic beverage processor's operator input may also be adjusted by trial-and-taste experience of the operator(s) to refine the processor operations with increasing experience.

An operator of the present invention may or may not also be the intended consumer of the photonic processed wine and/or beverage product. The operator in a typical installation of the present invention may provides the manual input to set the present inventions controller to produce a photonic beverage processor result that will meet the preferences of the intended consumers. In some cases the operator is also the intended consumer.

To assist consumers that do not have preferences or have undeveloped preferences, the present invention provides default settings that may be established by enjoyable experimental means by a large sample of previous operators/consumers. The present invention is capable of importing additional preferences from other operators over well known input means, e.g. Internet, solid-state drive, keyboard, wireless link, wireless tag, bar-code scanner. An alternate embodiment of the present invention includes a scanner that reads the recommendations for phonic-processing supplied from the manufacturer. The manufacturer's suggestion may printed on the label of the bottle, or can be downloaded from the Internet from the wine manufacturer web-site in connection with reading a bar-code and/or RFID tags on each bottle.

Exemplary embodiments of the present invention may be highly responsive to operator input for reasons including, but not limited to, that consumers have individual taste preferences, and not all foods (e.g., wines) require the same processing conditions. Even though consumers have individual preferences, it is quite common for groups of individuals to share common preferences for a particular processing of a particular Foodstuff. A useful method of using the present invention results in multiple operating modes tailored to an individual operator's input, or a consumer group's preferences, in order to meet a particular set of consumer preferences for a particular wines organoleptic properties.

Because of the complex relationship between photonic beverage processor operating parameters and the need to meet subjective consumer preferences, a suggested method of establishing a calibration database is to throw a "wine-tasting/calibration party" in which a plurality of wine consumers and/or connoisseurs perform a manual trial-and-taste method that requires them to taste (preferably small) samples of the wine during many interruptions of processing as processing progresses to determine the optimal operating parameters for a given wine.

In operation one uses the photonic bottled beverage processor to modify wine characteristics by placing a bottle in the bottle chamber and preferably aligning the lights with the area of the bottle that does not have a label and/or placing replacing reflective material over the label using an adhesive, change the preferences settings as needed according to manufacturer recommendations. The reflective tape adhesive is preferably a type that can be removed easily to present the bottle to the consumer. Close the top cover, then apply power to the photonic bottled beverage processor for the recommended time. After the photonic bottled beverage processor has completed the process cycle the wine bottle can be removed from the photonic bottled beverage processor chamber. Prior to applying power to the photonic beverage processor 1000-A, the operator inputs parameters into the photonic wine controller with external operator interface 18 including, intensities of available wavelength ranges (UVA1, violet, and blue), and duration of exposure (Time).

The preferred embodiment implements a plurality of light-sources with varying spectral radiance profile including, but not limited to, a first light-source with a peak wavelength ranging from four-hundred (400) nanometers (herein referred to as "nm") to four-hundred-ten (410) nanometers. Wherein said controlled light-source is comprising light-source components plurality of LEDs. Wherein said LEDs have a peak wavelength range from three-hundred-fifty-five (355) nm to four-hundred-ninety (490) nm. Each light-source has a nominal spectral radiance characteristic with a peak wavelength and/or full-width-half-maximum (herein referred to as "FWHM"), and a suitable radiance power output capable of meeting the intended consumer's preferences in a period of time shorter than that which the consumer is willing to wait. Generally, the plurality of light-sources types have different peak wavelength by approximately ten (10) nanometers. The plurality of light-sources is comprising arrays of LEDs of the same type and/or of varying types. The arrays of LEDs of varying types typically vary in the peak wavelength and/or FWHM and form-factor. The LED form-factor includes three milliliter through-hole type, five milliliter through-hole type, or surface-mount type. An surface-mount LED is typically mounted on a heat sink. The heat sink is optionally cooled with convection from a fan. The wine package is typically cooled with convection process, but may be liquid-cooled, or cooled by conduction with a suitably cold surface and heat sink.

The photonic beverage processor is comprising a plurality of components including, but not limited to, light-emitting devices. Said light-emitting devices emit a plurality of wavelengths of light suitable for photonic processing of food, wherein a consumable beverage such as wine is an example of food. The food processing methods include exposing food to a plurality of wavelengths for a period of time suitable to result in a modified food that meets a consumer's preferences.

The light-emitting devices in each apparatus may be comprising one or of a plurality of light-emitting device components including, but not limited to, LEDs, incandescent lamps, lasers, fluorescent lamps, mercury-vapor based lamps, in combination with spectral filters.

The light-emitting device is comprising a plurality of light-emitting device of one or more ultraviolet light-emitting devices. In an alternative embodiment the ultraviolet emitting light-sources are controlled with components including, but not limited to, a top-closed sensor electromechanical switch and a ultraviolet light opaque chamber to prevent the ultraviolet exposure to the operator. A preferred embodiment of the present invention uses a light-source with a peak wavelength shorter than 400 nm, and an ultraviolet opaque external material (e.g., stainless steel) such that ultraviolet exposure is reduced. In alternate embodiments, such as open type photonic beverage processors use light-sources with spectral radiance characteristic that emit allowable spectral radiance, generally wavelengths of 400 nm or longer.

The ultraviolet light-emitting devices are comprising one or more components including, but not limited to, ultraviolet LEDs having a peak wavelength in the range of from 355 nm to 400 nm.

In the operation of all the various forms of the photonic beverage processor the processing is performed essentially by exposing the food (e.g., wine) to light generated by the beverage processor. Manual-controlled versions of the beverage processor may have a simple mains power-supply plug and ON/OFF switch whereby the operator turns the power switch ON and OFF manually in which case the operator must personally determine how long the power should be applied, and manually remove power when the power is determined to be completed. In semi-automatic versions of the photonic beverage processor the power is applied for a timed period responsive to the preferences set by the operator, or based on stored settings tied to a bar-code scanner and an optional alarm sounds and/or indicator lights are transitioned from on to off or from off to on and/or an other electronic message is sent to the operators. The operation of automatic versions of the photonic beverage processor will include wine characteristic sensors (e.g., bar-code scanners, spectrometers, mass spectrometers) to determine the wine characteristics to determine the control sequence for a plurality of lights with specific wavelength ranges and the processing time for each color. The simplest control circuit is an electromechanical timer and may further include a visual display indicating duration of exposure at the start of the process and a completed process at the end of the process.

The preferred power-supply is capable of receiving multiple voltage and frequencies. Depending on local power delivery specifications; e.g., 110 VAC 60 hertz in North America, and 220 VAC 50 hertz in European Union.

The light-sources may be modular and may be changed or replaced to allow for additional functionality to be provided by the light-processor. The light-sources are positioned to exposing the wine through the un-labeled sides and/or though the bottom of the bottle, or from the top, sides and/or bottom of a cup.

The photonic beverage processor may be responsive to the output of one or more sensors capable of directly measuring wine properties, including, but not limited to, nuclear magnetic resonance components, spectroscopy, redox potential, pH, and electronic tongue.

Process control sensors and control loops may be incorporated for monitoring and/or controlling temperature of the wine and/or wine bottle. Such a thermostatic process control system is well known in the prior art. The fan speed may be controlled in order to maintain a wine temperature within in a range suitable for changing the organoleptic properties of the wine. Since the consumer preference determines the temperature at which the photonic processing occurs, the wine temperature is a variable that the operator inputs into the photonic beverage processor controller. Alternate embodiments of the photonic beverage processor include heaters, and/or chillers to control the temperature of the wine. The photonic beverage processor is used at normal atmospheric pressure that would vary depending on weather and elevation. Alternate embodiments of the present invention include liquid pressurizing means to provide the operator with an additional process control for which consumer's preferences may be met.

To meet a consumer's preferences any particular LS-Foodstuff has a range of suitable light processing conditions dependent on parameters including, but not limited to, composition, form-factor, packaging, type, age, time between processing and consumption, and mass. Each type of photonic Foodstuff processor is optimized for a range of LS-Foodstuff processing. Therefore, variations in the photonic Foodstuff processor characteristics including, but not limited to, controller, size, dynamic spectral radiance, heating, cooling, power-supply type, and form-factor. The variations in light-based Foodstuff processor controller type results from an operators preference to have a fixed result using a static controller which provides one consistent characteristic, and/or a variable controller which can be programmed to provide a range of conditions for LS-Foodstuff processing.

While the photonic beverage processor can be used to heat food to a desired temperature as a radiant heater, the novel use of the photonic beverage processor is for changing the organoleptic properties of the beverage.

An alternative embodiment of the present invention incorporates a light-source and a spectral filter capable of transmitting a suitable amount of preferred spectral energy and not transmitting un-preferred spectral energy. The spectral filter can be used in combination with the controlled light-source, or with an uncontrolled light-source such as the sun.

An alternate embodiment of the present invention incorporates a blue (approximately 470 nm peak) light-source capable of exposing a cup of wine from the top in order to modify the red wine flavor when the light is directed into the red wine for a controlled period of time after un-corking a bottle of red-wine and prior to consumption.

The present invention preferentially incorporates light-source power supplies that operate on either alternating current (herein referred to as "AC") and/or direct current (herein referred to as "DC") operation, LED power supplies, or incandescent lamps and filters. The power supplies are well known in the art and are generally off-the-shelf types.

An alternative embodiment of the present invention, the wine is tested in real time for process control and an indication is activated for the state of the wine, and a special indicator is made when the wine is ready. In another embodiment of the present invention the wine is exposed to light prior to bottling and/or during bottling.

For example, red wine in a cup is exposed to a light from an LED ("LED") with a peak wavelength of 470 nanometers from the top of the cup for a period of time that creates a change in the organoleptic properties of the beverage in order to meet a consumer preference.

The plurality of wine-modifying light-sources are powered by a plurality of light-source power supplies which dynamically control the spectral energy to meet the preferences of the operator. The light-source power supplies have a plurality of operating modes, including, but not limited to, manual, automatic, and sensor-based process control loops. The wine container has one or more wine container characteristics including, but not limited to, translucency that allow for exposing to light.

The bottle label is typically a light block, and therefore an alternative embodiment of the present invention shines the light through the bottom of the glass bottle, since labels are rarely if ever used on the bottom of the bottle.

Figure 2:
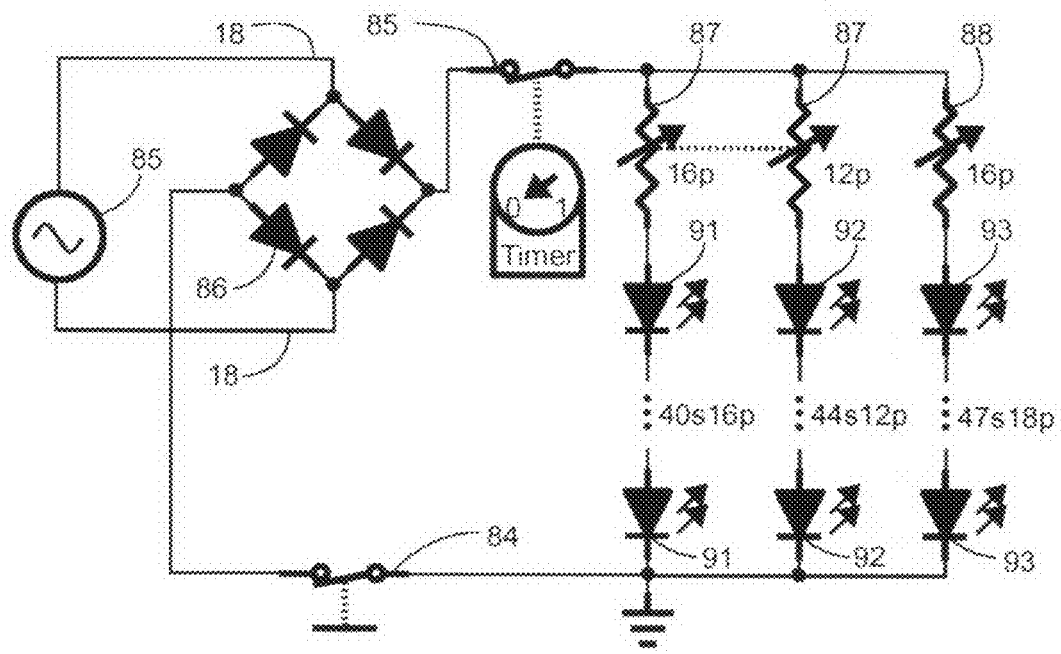
FIG. 2 is an schematic circuit diagram of the photon generating circuit of the photonic wine-processor 1000-A of FIG. 1B having a manual electromechanical TIMER controlling array-power switch 85, and having top "cover closed" sensing switch 84.

FIG. 2 is an schematic circuit diagram of the photon generating circuit of the photonic wine-processor 1000-A of FIG. 1B having a manual electromechanical TIMER controlling array-power switch 85, and having top "cover closed" sensing switch 84. The controlled light-sources may combinations of one or more light-source types including, but not limited to, light-emitting diode (herein referred to as "LED"), incandescent lamps, neon lamps, and mercury-vapor based lamps. Mercury-vapor lamps include commercially available types such as the black light and the black light blue lamps. The light-source may incorporate spectral filters to modify the spectral radiance emitted.

Figure 3:
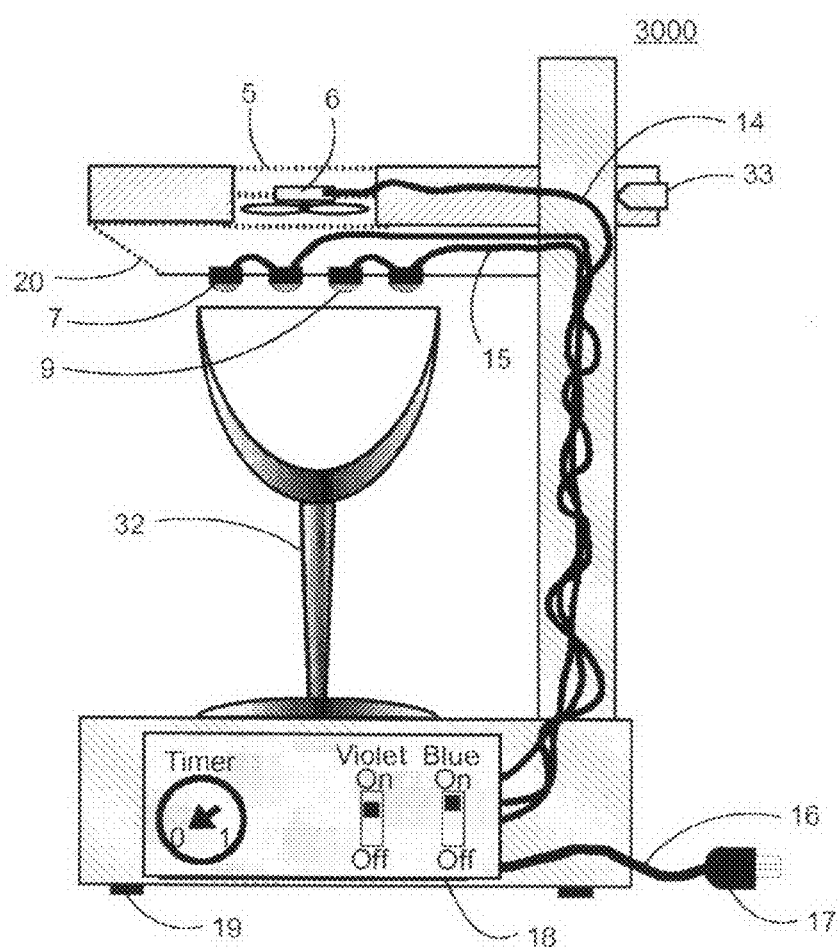
FIG. 3 is a side partial cut-away view of a photonic wine-processor having an adjustable-height form-factor suitable for receiving an open-top vessel (shown with an individual wine glass) according to another exemplary embodiment of the invention.
Figure 4:
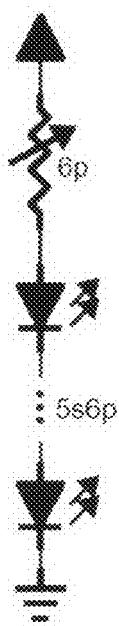
FIG. 4 is an schematic circuit diagram of an exemplary lighting emitting circuit having parallel ganged potentiometers each connected in series with a plurality of LEDs between a power voltage and ground.
Figure 5:
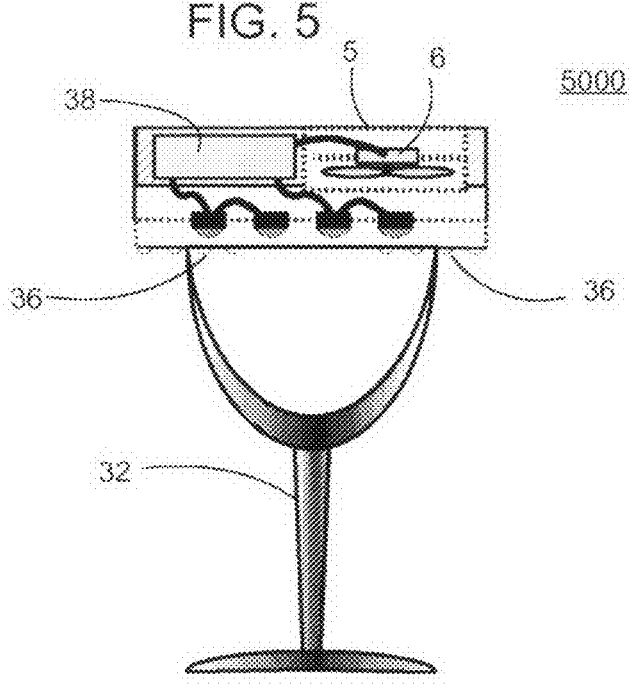
FIG. 5 is a side partial cut-away view of a photonic wine-processor 5000 having a portable and self contained power-supply and having a form-factor suitable for processing an open-top vessel (shown with an individual wine glass) according to another exemplary embodiment of the invention.
Figure 6:
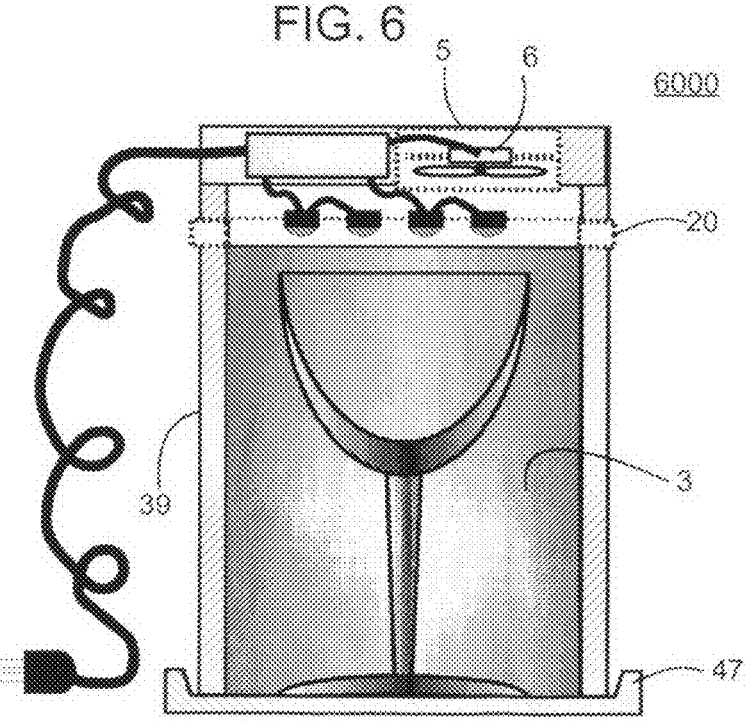
FIG. 6 is a side partial cut-away view of an enclosed photonic beverage processor 6000 having a shield and a form-factor suitable for a small open-top vessel (shown with an individual wine glass) according to another exemplary embodiment of the invention.

In each of FIG. 3, FIG. 4, FIG. 5, and FIG. 6 a photonic beverage processor adapted for use with open-top containers including, but not limited to, cups and wine glasses; is shown. Photonic processors in FIG. 3, and FIG. 5, which do not have opaque enclosures preferably do not generate wavelength ranges shorter than 400 nanometers. A photonic beverage processor preferably has substantially opaque containing walls (as shown in FIGS. 1B and 6) if one or more of the light sources emits ultraviolet light. The photonic process controller for non-contained cups is shown in FIG. 3, and FIG. 5 and preferably generates wavelengths only in the range of violet (450 nm peak) to blue (470 nm peak). Such wavelengths can be generated using a conventional florescent "black light" and ballast as the light (photon) generating circuit of a photonic beverage processor.

If a glass of wine is the form-factor to be processed then there is no issue of glass transmission through the open top and blue is a viable option, especially in an open processing system where some of the light escapes into the environment. Blue light requires more energy to process wine compared to UVA1, and violet. However, for use in an open container such as a cup, then there is no glass to absorb photons, in which case blue light is an effective optional wavelength range. Green and red are less effective in any form-factor and are therefore not recommended in the preferred operation of the present invention, but are optional depending on consumer preferences.

FIG. 3 is a side partial cut-away view of a photonic wine-processor having an adjustable-height form-factor suitable for receiving an open-top vessel (shown with an individual wine glass) according to another exemplary embodiment of the invention. The light source (e.g., two sets of LEDs) is disposed over the open-top vessel to expose the liquid at its top surface.

The photonic beverage processor 3000 has a cup-processing form-factor. The cup-size photonic beverage processor has an advantage for individuals consuming less than a bottle a session. In operation of the photonic wine cup processor 3000 (or 5000 in FIG. 5 or 6000 in FIG. 6) to modify wine characteristics in a single cup of wine at a time by pouring the wine from the bottle into the wine cup, setting the photonic wine cup processor mode and preferences settings, placing the photonic wine cup processor in a suitable position for exposing the wine typically on top of the wine cup, powering the photonic wine cup processor for the recommended time (typically fifteen minutes).

The operator taste tests the wine if the operator knows the consumer preferences, or the consumer taste tests the wine to determine if the wine should undergo photonic processing. Additional photonic wine processing is applied as needed, after the wine undergoes additional photonic processing, additional taste testing is repeated until it is determined that the wine is ready for consumption because it meets the consumer's preferences.

Processing Procedure:
Step 1: Opening the bottle of beverage.
Step 2: Taste the beverage; if the beverage organoleptic properties meets the consumer preference then goto Step 4; otherwise estimate the processing time and wavelength range needed.
Step 3: Process for the estimated time at estimated wavelength range; Return to Step 2.
Step 4: Serve beverage.

FIG. 4 is an schematic circuit diagram of an exemplary lighting emitting circuit having parallel ganged potentiometers (87, 88) each connected in series with a plurality of LEDs (91, 92, 93) between a power voltage and ground.

LEDs having different output peak wavelengths may also have different electrical characteristics, such as forward voltage. When connecting series strings each composed of different LEDs in parallel between a given power supply, it is often preferred to vary the number of LEDS in each series string according to each's forward voltage characteristic. "40s16p" is a shorthand notation for equivalent to 40 LEDs in each series string with six series strings in parallel. "44s12p" is a shorthand notation for equivalent to 44 LEDs in each series string with twelve series strings in parallel. "47s18p" is a shorthand notation for equivalent to 44 LEDs in each series string with twelve series strings in parallel.

FIG. 5 is a side partial cut-away view of a photonic wine-processor 5000 having a portable and self contained power-supply and having a form-factor suitable for processing an open-top vessel (shown with an individual wine glass) according to another exemplary embodiment of the invention.

The photonic beverage processor 5000 has an over-cup form-factor. The light source (e.g., two sets of LEDs) is disposed over the open-top vessel to expose the liquid at its top surface.

The cup may be selected to have a substantially reflective internal surface that increases the efficiency of the process, reduces escape of light, and thus using less time for equivalent light source emissions.

FIG. 6 is a side partial cut-away view of an enclosed photonic beverage processor 6000 having a shield and a form-factor suitable for a small open-top vessel (shown with an individual wine glass) according to another exemplary embodiment of the invention. It includes a chamber for receiving and supporting an open-top vessel such as a wine glass. The light source (e.g., two sets of LEDs) is disposed over the open-top vessel to expose the liquid at its top surface. The covered photonic beverage processor 6000 has a one-cup form-factor.

Figure 7:
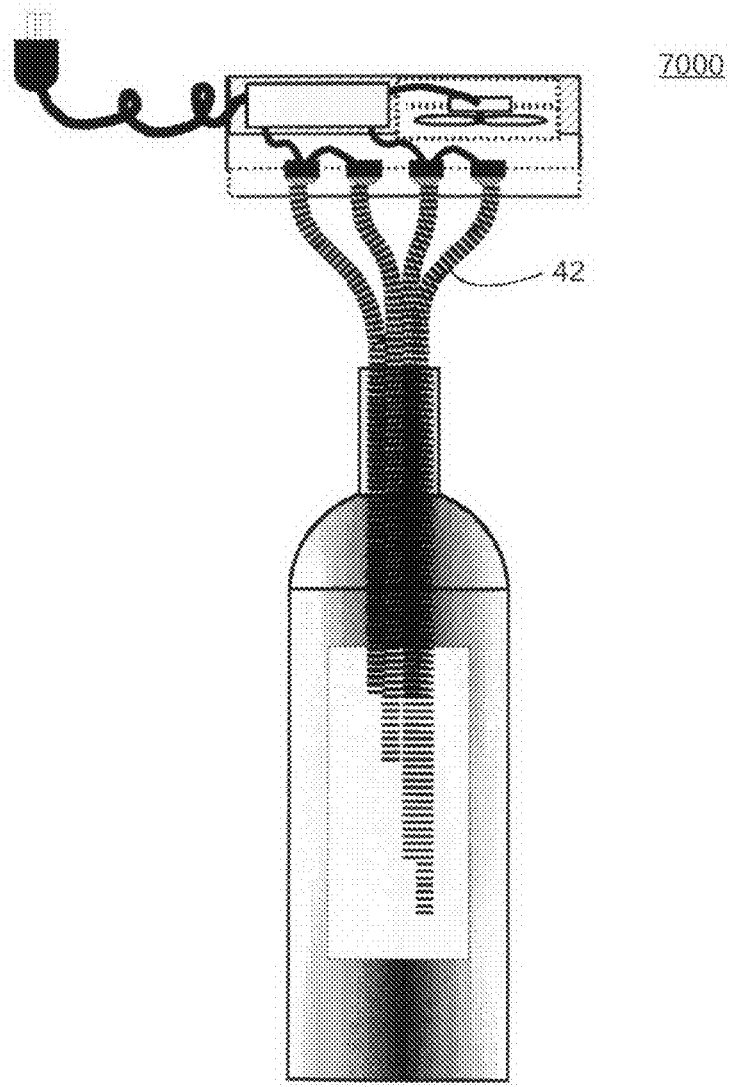
FIG. 7 is a side partial cut-away view of a photonic beverage processor 7000 having a fiber-optic light delivery pipe inserted inside a bottle as a form-factor suitable for processing the contents of commercially available wine bottles from the inside thereof, according to another exemplary embodiment of the invention.

FIG. 7 is a side partial cut-away view of a photonic beverage processor 7000 having a fiber-optic light delivery pipe inserted inside a bottle as a form-factor suitable for processing the contents of commercially available wine bottles from the inside thereof, according to another exemplary embodiment of the invention.

In a preferred embodiment, the light is emitted within the liquid inside the bottle, suspended from a stopper sized for insertion into the orifice of the container (e.g., wine bottle). The stopper passes at least one light pipe so that a light source above the stopper can expose wine below the stopper, without passing the light through the glass wall of the wine-bottle. This embodiment is fairly safe for even ultraviolet light assuming the wine bottle is full especially if the wine bottle has green or brown glass.

In FIG. 7, a multi-length light pipe 42 inserted into the wine inside the bottle. The covered photonic beverage processor 7000 has a fiber-optic light-pipe 42 for in-bottle processing of the liquid (e.g., wine) contained in the wine bottle.

Figure 8:
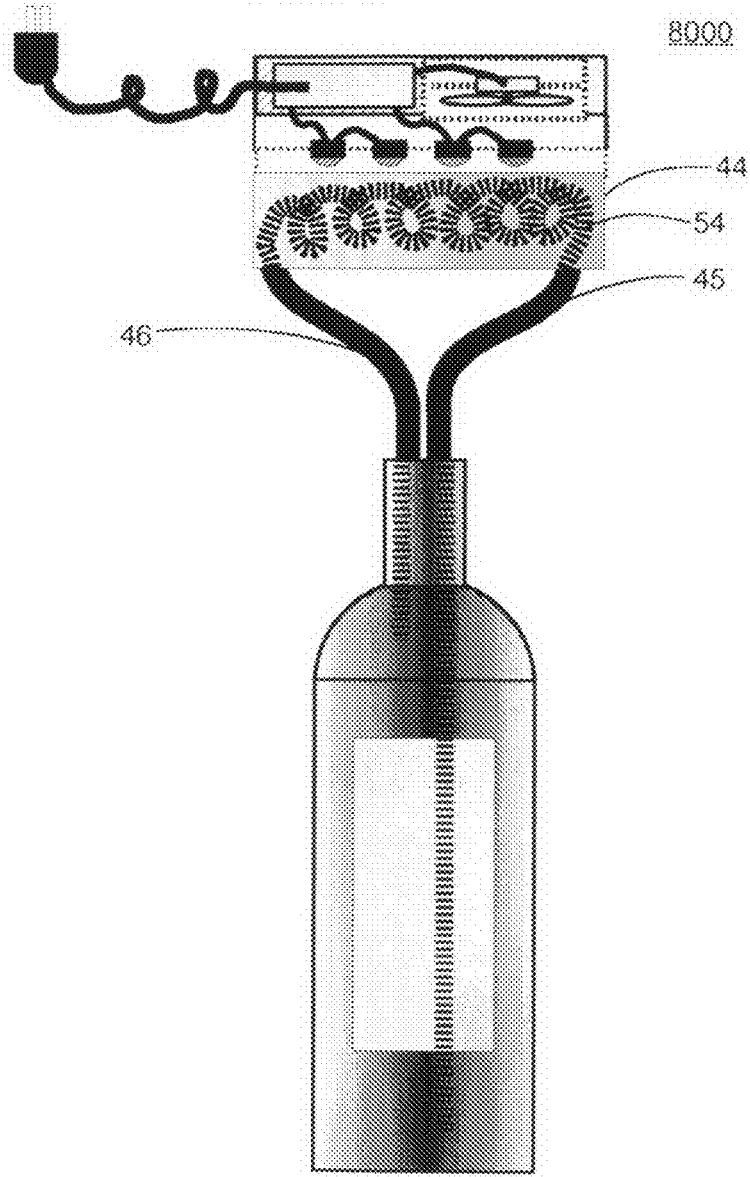
FIG. 8 is a side partial cut-away view of a photonic beverage processor system 8000 having a liquid pump and inflow and outflow tubes inserted inside a bottle as a form-factor suitable for processing the contents of commercially available wine bottles from the inside thereof, according to another exemplary embodiment of the invention.

FIG. 8 is a side partial cut-away view of a photonic beverage processor system 8000 having a liquid pump with inflow and outflow tubes inserted inside a bottle providing a form-factor suitable for processing the contents of commercially available wine bottles from the inside thereof, according to another exemplary embodiment of the invention. This embodiment is fairly safe for even ultraviolet light.

The covered photonic beverage processor 8000 has a fluid pump for processing the liquid from inside a bottle. The fluid-siphon method may accelerate processing at a given power consumption rate.

Figure 9:
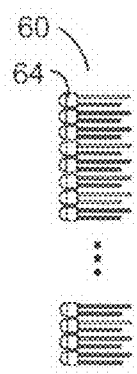
FIG. 9 is a side view of forty-four separate three millimeter type LEDs arranged in a linear array prior to soldering.
Figure 13:
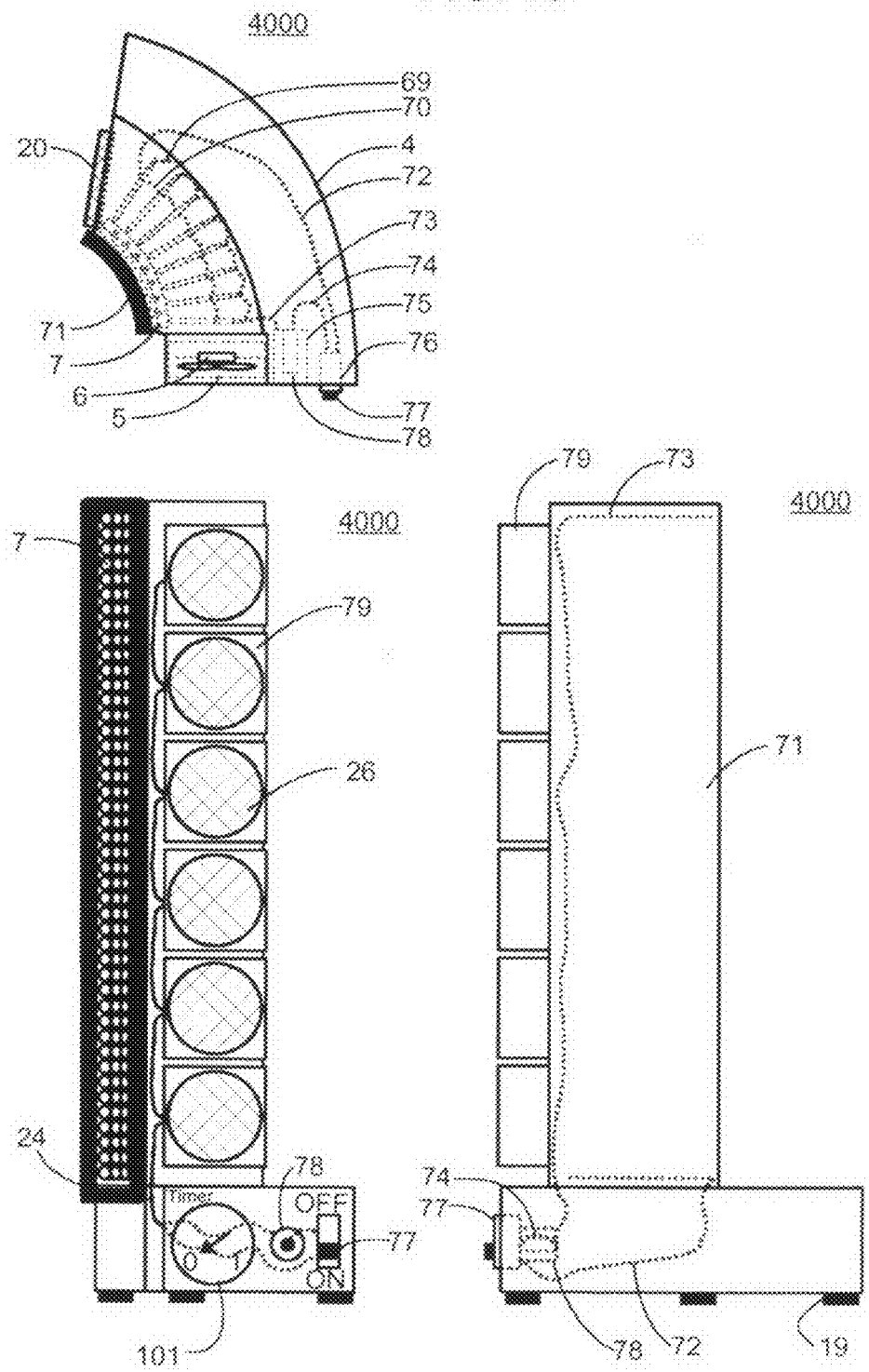
FIG. 13 is an isometric front, back, and side view of an open photonic beverage processor 4000 having a light-opaque gasket in a form-factor suitable for side-processing the contents of a commercially standard seven-hundred-fifty milliliter (herein referred to as "750 ml.") bottle of red wine.

FIG. 9 is a side view of forty-four separate three millimeter type LEDs arranged in a linear array prior to soldering, (e.g., prior to incorporation within the photonic beverage processor 4000 of FIG. 13).

Figure 10:
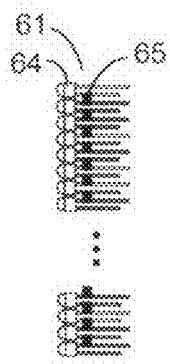
FIG. 10 is a side view of the forty-four three millimeter type LEDs assembly with adjacent anodes and cathodes electrically and mechanically connected with solder to create a linear LED series array.

FIG. 10 is a side view of the forty-four three millimeter type LEDs assembly with adjacent anodes and cathodes electrically and mechanically connected with solder to create a linear LED series array.

Figure 11:
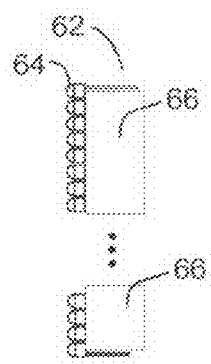
FIG. 11 is a side view of the LED series array 65 of FIG. 10 anodes and cathodes covered with an electrically non-conductive material 66 (e.g., a dielectric tape)

FIG. 11 is a side view of the LED series array 65 of FIG. 10 anodes and cathodes covered with an electrically non-conductive material 66 (e.g., a dielectric tape).

Figure 12:
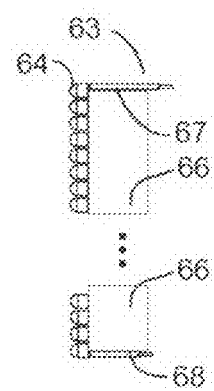
FIG. 12 is a side view of the LED series array 65 with a stiff partially-insulated wire extension at each of the cathode and anode for mechanical and electrical connection to a power-supply bus bar and a ground bus bar.

FIG. 12 is a side view of the LED series array 65 with a stiff partially-insulated wire extension at each of the cathode and anode for mechanical and electrical connection to a power-supply bus bar and a ground bus bar.

FIG. 13 is an isometric front, back, and side view of an open photonic beverage processor 4000 having a light-opaque gasket in a form-factor suitable for side-processing the contents of a commercially standard seven-hundred-fifty milliliter (herein referred to as "750 ml.") bottle of red wine.

A peak wavelength range of 405 nm to 490 nm is preferred for open photonic beverage processors especially while processing clear wine bottle glass, and combinations of UVA1, violet and/or blue are preferred for closed photonic processors.

Figure 14:
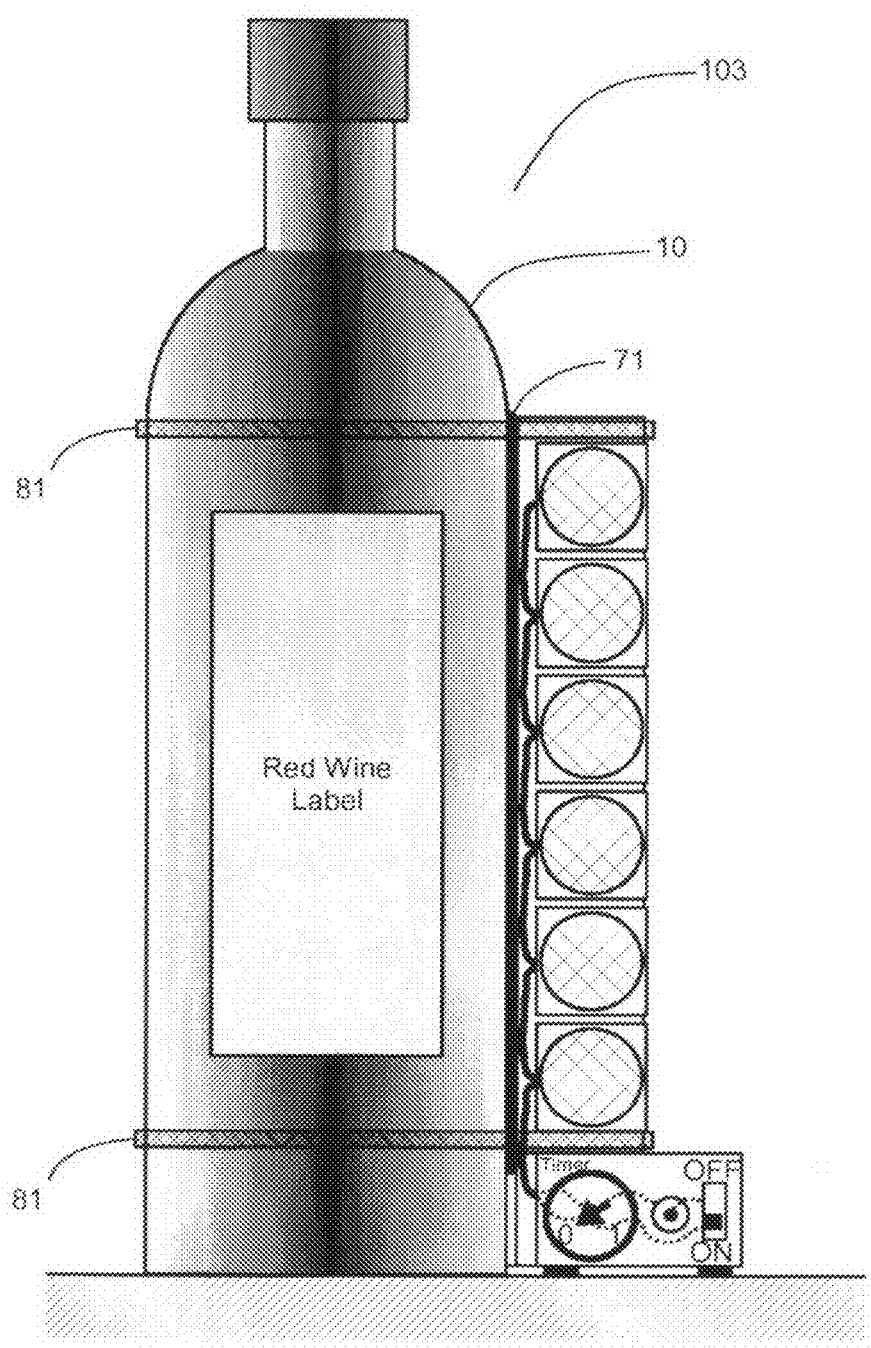
FIG. 14 is a side view of a seven-hundred-fifty milliliter bottle of red wine, being processed by the photonic beverage processor 4000 of FIG. 13, in a proper position for effective light processing (e.g., avoiding the labels)

FIG. 14 is a side view of a seven-hundred-fifty milliliter bottle of red wine, being processed by the photonic beverage processor 4000 of FIG. 13, in a proper position for effective light processing (e.g., avoiding the bottle's labels).

The specification of a light processing method for a given wine type is considered to be a settings selection (or "wine aging recipe") analogous to a cooking recipe. A settings selection includes a description of a method of using the photonic beverage processor, the materials, the sequence of exposures, and the wavelength range, fluid flow parameters, duration of exposure, and dynamic radiance of each exposure. For example, a settings selection for using the photonic beverage processor is the following: Open a bottle of Black Swan (Australia) Cabernet Sauvignon 2008, pour 150 milliliters or red wine into a glass, set the photonic beverage processor for glass form-factors to emit 2 Watts of blue light at 470 nm peak for 15 minutes, stir every 5 minutes, and taste. If the wine is not processed to meet the consumer preferences, then continue to process for 5 minutes before tasting again; repeat until consumer preference are met. When the consumer preferences are met then serve wine to consumer.

Fluid flow in bottles may be simply achieved by manual shaking of the bottle, and in an alternative embodiment of the present invention, shown in FIG. 14B, the bottle is securely fastened to the bottle during processing and the entire assembly of the photonic beverage processor and the bottle can be shaken manually. Alternative embodiments of the present invention include a motorized or otherwise powered means to vibrate the bottle and/or spin the bottle to create fluid flow within the bottle. Fluid flow is not required in every settings selection. In some settings selections the wine is not stirred or shaken, but a complex result is created since the wine in the center of the bottle receives less processing.

The photonic beverage processor may incorporate substantially asymmetric light exposure which creates temperature gradients and density gradients which result in fluid flow useful for providing greater consistency of processing over the entire volume of fluid being processed.

EXAMPLES

Experiment 1

An open cup form-factor photonic beverage processor with an effective output of 0.374 Watts of UVA1 with Redwood Creek California Merlot Frei Brothers Vineyard Vintage 2007 Alcohol 13.5% by volume. This was a bottle opened the previous day and there was three quarters of the bottle remaining. A typical wine cup was used with an opening 2.75 inches wide, a depth of 3.25 inches, and a full volume of 8.0 ounces. Two substantially identical cups were used and the wine was poured 60 milliliters in each cup. One cup was allowed to sit with just air and a dummy aluminum foil cap, the other cup had the UVA1 LED with a peak wavelength of approximately 365 nm. Every 10 minutes the cups were stirred with two different but similar spoons. After 15 minutes it was discernible that the UVA1 LED modified the organoleptic properties of the red wine. After 5 minutes, it was readily discernible by taste that the there was a difference in the two cups. A blinding randomization of the cups was used by spinning the two ups for a period of time to get the cups randomized, and the taste was still discernible. This experiment showed that UVA1 was an effective wavelength range for the photonic processing of red wine.

Experiment 2

An open cup form-factor photonic beverage processor with an effective output of 0.374 Watts of UVA1 with Redwood Creek California Merlot bottled by Frei Brothers Vineyard Vintage 2007 Alcohol 13.5% by volume using the leftover from the same bottle that was opened two days previously. The light-source had a peak wavelength of 365 nm, a 60 milliliter volume of wine was used, a duration of 30 minutes, without stirring. This experiment was performed on the remaining one-quarter bottle. The wine was already exposed to air for two days, so that the difference was not as noticeable as the Experiment 1, but was instead a slightly less discernible difference than wine that was just opened immediately prior to light processing. This experiment confirmed that UVA1 was an effective wavelength range for the photonic processing of red wine.

Experiment 3

An open cup form-factor photonic beverage processor with an effective output of 0.374 Watts of UVA1 with Black Swan Cabernet Sauvignon Australia 2008. The light-source had a peak wavelength of 365 nm, a 60 milliliter volume of wine was used, a duration of 30 minutes, without stirring. The cups were marked on the bottom and the cups were randomized, and the cup with the exposure was discernible in 80 percent of the tests. This bottle was not previously opened. This experiment re-confirmed that UVA1 was an effective wavelength range for the photonic processing of red wine.

Experiment 4

An open cup form-factor photonic beverage processor with an effective output of 0.595 Watts of violet light with a peak wavelength of approximately 405 nm processed Black Swan Cabernet Sauvignon Australia 2008. A 60 milliliter volume of wine was used, a duration of 30 minutes, without stirring. The cups were marked on the bottom and the cups were randomized, and the cup with the exposure was discernible in six out of six tests. This bottle was open for a day prior to light-processing. The violet light was created by thirty-six (36) pieces of the T3 packaged LEDs in a 6 by 6 square array measuring 1.2 inches by 1.2 inches. This experiment indicated that violet light was an effective wavelength range for the photonic processing of red wine.

Experiment 5

An open cup form-factor photonic beverage processor with an effective output of 0.561 Watts of blue light with a peak wavelength of approximately 470 nm processed Black Swan Cabernet Sauvignon Australia 2008. A 60 milliliter volume of wine was used, a duration of 30 minutes, without stirring. The cups were marked on the bottom and the cups were randomized, and the cup with the exposure was discernible in six out of six tests. This bottle was open for a day. Blue light six (6) pieces of surface mount 470 nm peak mounted on a heat sink without a fan, running at a heat sink temperature was 97 degrees Fahrenheit. This experiment indicated that blue was an effective wavelength range for the photonic processing of red wine.

Experiment 6

An bottle form-factor photonic beverage processor with an effective output of 10.8 Watts of violet at a peak wavelength of approximately 405 nm was used to process a seven-hundred-fifty (750) milliliter bottle of Black Swan, Australia, Cabernet Sauvignon 2008, was left unopened in the experimental bottle chamber of seven-hundred-four (704) three (3) milliliter LEDs arranged as two (2) equivalent arrays of on either side of the bottle shining into areas of the bottle that were not covered by labels (405) nanometers for a period of two (2) hours. The equivalent arrays were each comprising eight (8) parallel arrays of forty-four (44) LEDs in series, as shown in FIG. 4 herein. The sixteen sets of forty-four LEDs were arranged so that the optical axis of each LED was perpendicular to the surface of the round glass bottle and were powered by a bridge-rectified one-hundred-ten volt AC power source. The bottle was opened immediately after the light-treatment and taste compared within one (1) hour against an untreated control wine sample poured from a seven-hundred-fifty (750) milliliter bottle of the same wine variety, vintner and year. Six (6) people blinded from the details taste compared the treated wine and the untreated control wine at the same wine temperature of approximately seventy (70) degree Fahrenheit. Every person preferred the treated wine over the untreated control. Since, this experiment used an un-opened bottle, this experiment determined that the change is not dependent on wine breathing, and the change is not dependent on loss of alcohol or other vapors due to the light exposure. The bottle was shaken every 30 minutes. This experiment indicated that an un-opened bottle of red wine could be processed with a photonic beverage processor, and that violet light was an effective wavelength range for passing through a green glass bottle for the photonic processing of red wine. This experiment showed that photonic wine processing was not dependent on air or breathing type processing.

Experiment 6A

An open cup form-factor photonic beverage processor with an effective output of 0.595 Watts of violet light with a peak wavelength of approximately 405 nm processed approximately four (4) fluid ounces of red wine, Black Swan, Australia, Cabernet Sauvignon 2008, was treated in an open top white ceramic cup for one (1) hour with thirty-six (36) LEDs with a peak wavelength of substantially four-hundred-five (405) nanometers. The cup was not stirred for the exposure. After the treatment period the treated wine was taste compared to a glass of untreated wine from the same bottle by three (3) people; all of whom concluded that the treated wine had modified organoleptic properties wherein the wine taste improved and was smoother than the untreated wine. The treated wine was then placed in a refrigerator at approximately forty (40) degrees Fahrenheit. Twenty-four hours later, the treated wine was removed from the refrigerator and was then heated to room temperature using a standard microwave on high for fifteen (15) seconds, then the treated wine was taste compared again by the same three people who had compared it the previous day; to determine unanimously that the chilled refrigerator temperature remained with a smooth taste compared to the untreated wine from the same bottle. This experiment showed that for this wine reflecting that the change was permanent for the duration of one (1) day, and that microwaving the treated wine for a brief period does not substantially change the smoothness of the treated wine. This experiment showed that photonic processing of wine was persistent over time, could be cooled and heated, and still retained the modified properties of the processed wine.

Experiment 7

An bottle form-factor photonic beverage processor with an effective output of 10.8 Watts of violet at a peak wavelength of approximately 405 nm was used to process a seven-hundred-fifty (750) milliliter bottle of Black Swan, Australia, Cabernet Sauvignon 2008, was left unopened in the experimental bottle chamber of four-hundred-five (405) nanometers for a period of two hours without shaking or other fluid flow. The bottle was not opened until the next day. The bottle was opened immediately after processing and determine with three (3) people that a change occurred to increase the smoothness of the wine. This experiment showed that a un-opened bottle of wine processed with a photonic beverage processor has a persistent modification to organoleptic properties. This experiment also showed that the vibration of a fan and the temperature gradient produced enough fluid flow to create a modification to the organoleptic properties of a red wine, and that shaking was optional.

Experiment 8

An open cup form-factor photonic beverage processor with an effective output of 1.26 Watts of incandescent white light with a cup form-factor photonic processor consisting a twelve (12) fluid ounce cup wrapped on the outside with aluminum foil with an open top of approximately four (4) fluid ounces of Black Swan, Cabernet Sauvignon 2008, was placed under an incandescent sixty (60) Watt incandescent bulb in an aluminum utility light fixture was used to determine when the white light changes the wine at 3 inches from the lamp to the wine. A translucent acrylic sheet was placed over the cup to keep the infra-red heat from the lamp to a minimum but still allow the wine to receive the incandescent light. The exposure duration was 90 minutes, with some shaking every 30 minutes. A second twelve (12) fluid ounce control cup wrapped on the outside with aluminum foil was used for comparing the first cup. Due to the bright incandescent light, temperature of the treated cup was measured by infra-red thermometer, of type IR Thermometer manufactured by Radio Shack Cat. No.

22-325, eighty-six (86) degrees Fahrenheit, and the temperature of the untreated cup was measured by the same infrared thermometer to be sixty-nine (69) degreed Fahrenheit. The treated cup was capped so that no additional vapor loss occurs and was allowed to cool by forced air convection on the outside of the cup for 30 minutes cooling process until sixty-nine (69) degrees Fahrenheit prior to taste testing. The taste comparison determined that the incandescent lamp did not have much when any effect to change the wine to a smoother characteristic. This experiment showed that an incandescent white light is inferior at producing the combined wavelengths to modify the organoleptic properties of wine when compared to LEDs. This experiment showed that incandescent lamps present an over-heating situation that would have to be countered with significant cooling capacity, and are therefore less interesting for further investigation for an optimized photonic beverage processor. A filtered incandescent lamp may present less heating and a viable alternate embodiment, but is not preferred to the LED embodiments.

Experiment 9

An bottle form-factor photonic beverage processor with an effective output of 10.8 Watts of violet at a peak wavelength of approximately 405 nm was used to process a seven-hundred-fifty (750) milliliter bottle of Black Swan, Australia, Cabernet Sauvignon 2008, was left unopened in the experimental bottle chamber of four-hundred-five (405) nanometers for a period of three and one-half hours without shaking or other fluid flow. The bottle was not opened until the next day, 27 hours later. The bottle was opened one day after processing and determine with three (3) people that a change occurred to increase the smoothness of the wine.

An attempt was made to determine when over-processing ruined the wine, but processing a bottle of wine for four hours did not ruin the wine, but it did not create what could be described as a double effect. Since the effects are arbitrary the and depend on consumer's preferences, there is no way to foretell what the best manner or optimal process is. The point of the present invention is that wavelengths of light change the wine organoleptic properties and that a majority of sampled consumer preferences is used to provide recommendations for use. In an analogous manner as other cooking utensils the preferred use is determined by the operator.

Experiment 10

An open cup form-factor photonic beverage processor with an effective output of 0.374 Watts of UVA1 with Redwood Creek California Merlot Frei Brothers Vinyard Vintage 2007 Alcohol 13.5% by volume. This was a bottle opened the previous day and there was three quarters of the bottle remaining. A typical wine cup was used with an opening 2.75 inches wide, a depth of 3.25 inches, and a full volume of 8.0 ounces. Two substantially identical cups were used and 60 milliliters wine was poured to the same height in each cup. One cup was allowed to sit with just air and a dummy aluminum foil cap, the other cup had the UVA1 LED with a peak wavelength of approximately 365 nm. Every 10 minutes the cups were stirred with two different but similar spoons. After 15 minutes it was discernible that the UVA1 LED modified the organoleptic properties of the red wine. After 60 minutes, it was readily discernible by taste that the there was less flavor in the cup that underwent photonic processing. This experiment showed that in some cases a consumer preference may be exceeded by too many Joules of processing, and that if the intended consumer preference requires a maximum processing then a recipe should include both a minimum acceptable and a maximum acceptable limit to photonic wine processing. This experiment showed that there is a range of processing parameters that produce results that meet the intended consumers expectations.

Experiment 11

An cup type form-factor photonic beverage processor with an effective output of 0.253 Watts of green light with a peak wavelength of approximately 522 nm processed 30 milliliters of Black Swan (Australia) Merlot 2008. The 30 milliliters of wine was placed in a 60 millimeter glass bottle with screw on cap. Shaking occurred every 30 minutes of exposure. A discernible modification to the wines organoleptic properties occurred after 330 minutes. The green light was provisioned by 24 pieces of 5 milliliter through-hole LED 522 nm peak on 4 by 6 array measuring 1.1 inch by 1.3 inches. This experiment indicated that green was not an effective wavelength range for the photonic processing of green wine, and therefore green is not a preferred wavelength for photonic wine processing. However, if user preference require the green wavelength range then an alternate embodiment of the present invention would provision this wavelength range.

Experiment 12

An cup type form-factor photonic beverage processor with an effective output of 0.324 Watts of red light with a peak wavelength of approximately 522 nm processed 30 milliliters of Black Swan (Australia) Merlot 2008. The 30 milliliters of wine was placed in a 60 millimeter glass bottle with screw on cap. Shaking occurred every 30 minutes of exposure. A discernible modification to the wines organoleptic properties occurred after 330 minutes. The red light was provisioned by 24 pieces of 5 milliliter through-hole LED 522 nm peak on 4 by 6 array measuring 1.1 inch by 1.3 inches. This experiment indicated that red was not an effective wavelength range for the photonic processing of red wine, and therefore red is not a preferred wavelength for photonic wine processing. However, if user preference require the red wavelength range then an alternate embodiment of the present invention would provision this wavelength range.

Experiment 13

An closed cup form-factor photonic beverage processor with an effective output of 0.374 Watts of UVA1 with a peak wavelength of approximately 365 nm for 60 milliliters of a white wine at 90 minutes of exposure. There was no discernible change in the white wine organoleptic properties. The wine was exposed from the bottom of the clear glass jar. The jar was shaken every 30 minutes. This experiment showed that UVA1 was an in-effective wavelength range for the photonic processing of white wine. However, the photonic processing of white wine may be preferred by a set of consumers.

Experiment 14

An closed cup form-factor photonic beverage processor with an effective output of 0.595 Watts of violet light with a peak wavelength of approximately 405 nm for 60 milliliters of a white wine at 90 minutes of exposure. There was no discernible change in the white wine organoleptic properties. The wine was exposed from the bottom of the clear glass jar. The jar was shaken every 30 minutes. This experiment showed that violet light was an in-effective wavelength range for the photonic processing of white wine. However, the photonic processing of white wine with UVA light may be preferred by a set of consumers.

Experiment 15

A closed cup form-factor photonic beverage processor with an effective output of 0.561 Watts of blue light with a peak wavelength of approximately 470 nm processed for 60 milliliters of a white wine at 90 minutes of exposure. There was no discernible change in the white wine organoleptic properties. The wine was exposed from the bottom of the clear glass jar. The jar was shaken every 30 minutes. This experiment showed that blue was an in-effective wavelength range for the photonic processing of white wine. However, the photonic processing of white wine with blue light may be preferred by a set of consumers.

Experiment 16

A closed cup form-factor photonic beverage processor with an effective output of 0.253 Watts of green light with a peak wavelength of approximately 470 nm processed for 60 milliliters of a white wine at 90 minutes of exposure. There was no discernible change in the white wine organoleptic properties. The wine was exposed from the bottom of the clear glass jar. The jar was shaken every 30 minutes. This experiment showed that blue was an in-effective wavelength range for the photonic processing of white wine. However, the photonic processing of white wine with green light may be preferred by a set of consumers.

Experiment 17

A closed cup form-factor photonic beverage processor with an effective output of 0.324 Watts of red light with a peak wavelength of approximately 470 nm processed for 60 milliliters of a white wine at 90 minutes of exposure. There was no discernible change in the white wine organoleptic properties. The wine was exposed from the bottom of the clear glass jar. The jar was shaken every 30 minutes. This experiment showed that red was an in-effective wavelength range for the photonic processing of white wine. However, the photonic processing of white wine with red light may be preferred by a set of consumers.

In all experiments clean cups of inert material including, ceramic and glass cups were obtained so that residue or foreign matter did not alter the results. The cup material was a clear glass if not specified otherwise. The temperature of the ambient environment and starting temperature of the wine was room temperature of approximately seventy-two degrees Fahrenheit, and substantially atmospheric pressure at Albany, N.Y., U.S.A elevation. The effective output of a photonic beverage processor is the power of light in the wavelength range reaching the wine. The power input to a photonic beverage processor is the integration of voltage times current over time. The light-sources convert the electric power to converted power output with a characteristic efficiency that varies with temperature, pressure, voltage and current. The effective power output of a photonic beverage processor is generally less than the converted power output by factors including geometric losses and losses due to less than unity spectral transmission in optical absorption by materials such as the glass wine bottle. The converted power output values were derived from manufacturers data sheets or from known conversion efficiencies of the materials. In all cases the effective power output are estimated and/or calculated to within an error margins of plus or minus 50 percent. The durations are measured with watches and have an error margin of plus or minus 1 minute. The thermometer used was an infra-red variety with an error margin of plus or minus 1 degree Fahrenheit at a nominal room temperature of 72 degrees Fahrenheit. In the randomized blind taste comparison experiments the cups were blinded by marking on the bottom surfaces of the cups that were not observable to the taste tester. The organoleptic property changes included taste tester senses including, but not limited to, taste, and smell. The FWHM of the LEDs were approximately 10 nanometers.

An alternative embodiment is the use of a modified tanning bed with UVA1 lamps, such as the Philips TL10. The green glass of a wine bottle is a filter for short wavelength light and passes significant amounts of UVA1 to create a change of wine characteristics. An acrylic rack is used to hold multiple bottles of wine for allowing light to pass through the rack. Any rack can be used that allows enough light to reach the bottles. When the rack is not translucent then less light reaches the bottle and therefore more time and energy to power the lights is required. For a wine distributor or a vintner there is a need to process the bottles in bulk.

An alternate embodiment of the present invention is adapted for a continuous operation photonic wine processing operation by placing bottles of wine on a conveyor (net, belt, etc) and passing them under the UVA1 lights to change the organoleptic properties of wine. In the continuous process the bottles may be vibrated and rolled to create fluid flow and mixing within the bottle to get a consistent light flux on the wine. For example, a method for continuous processing bottles of red wine in the photonic beverage processor is as follows. All 750 milliliter bottle of red wine are treated for 30 minutes in the UVA1 chamber. Depending on the speed of the web the number of UVA1 lights is adapted to meet the need. A continuous conveyor speed passing ten thousand (1,000) bottles an hour requires the equivalent of approximately four-thousand-four-hundred (440) TL10 bulbs. Each six (6) foot bulb occupies at least one-half inch of width side-by-side and the 440 bulbs and housing takes up approximately forty (40) feet by, eight (8) feet of floor space. Alternatively the wine bottles may be stationary relative to the ground, and the light-source moves relative to the beverage.

Alternative embodiments of the present invention place the LED array in an approximately forty-five degree arc around the bottle in order to avoid the label. Alternatively the LEDs can be flexible array to bend to the shape of the bottle and to avoid the labeled area of the bottle.

In various embodiments of the present invention the subject beverage is comprising one or more components including, but not limited to, a wine, a fruit juice, a fermented fruit juice, a soy product, a grain product, a beer, a malt liquor, an alcoholic beverage, a liquor, a scotch, a tequila, a brandy, a coffee. Such a fruit juice may be comprising, but not limited to, a grape juice. Said wine may be comprising wine components including, but not limited to, a red wine, a white wine, a rosé wine.

The foregoing is illustrative of exemplary embodiments of the invention and is not to be construed as limiting thereof. Although a few exemplary embodiments of the invention have been described, those skilled in the art will readily appreciate that many modifications are possible in exemplary embodiments of the invention without materially departing from the novel teachings and advantages.

Accordingly, all such modifications are intended to be included within the scope of this invention as defined in the claims. Therefore, it is to be understood that the foregoing is illustrative of various exemplary embodiments of the invention and is not to be construed as limited to the specific embodiments disclosed, and that modifications to the disclosed embodiments, as well as other embodiments, are intended to be included within the scope of the appended claims.

What is claimed is:

1. A method of processing a liquid food, said method comprising:
   exposing wine to artificial light wherein the artificial light consists of a peak wavelength ranging between 355 nm and 400 nm inclusive, does not include a peak wavelength longer than 400 nm and has an intensity and duration such that the wine is exposed to a total of between 5 kilojoules/liter and 2000 kilojoules/liter of photonic energy.

2. The method of claim 1, further comprising cooling the wine while exposing the wine to the artificial light.

3. The method of claim 1, wherein the wine is exposed to the artificial light between 2 minutes and 36 hours.

4. The method of claim 1, wherein the wine is maintained less than 10 degrees Fahrenheit above ambient temperatures.

5. The method of claim 3, wherein the wine is in a bottle.

* * * * *